US012603421B2

(12) United States Patent
Kim

(10) Patent No.: US 12,603,421 B2
(45) Date of Patent: Apr. 14, 2026

(54) ANTENNA SYSTEM MOUNTED ON VEHICLE

(71) Applicant: LG ELECTRONICS INC., Seoul (KR)

(72) Inventor: Changil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 193 days.

(21) Appl. No.: 18/285,083

(22) PCT Filed: Jun. 2, 2021

(86) PCT No.: PCT/KR2021/006884
§ 371 (c)(1),
(2) Date: Sep. 29, 2023

(87) PCT Pub. No.: WO2022/255517
PCT Pub. Date: Dec. 8, 2022

(65) Prior Publication Data

US 2024/0170836 A1 May 23, 2024

(51) Int. Cl.
*H01Q 1/32* (2006.01)
*H01Q 9/30* (2006.01)
*H01Q 13/10* (2006.01)

(52) U.S. Cl.
CPC ............ *H01Q 1/3275* (2013.01); *H01Q 9/30* (2013.01); *H01Q 13/10* (2013.01)

(58) Field of Classification Search
CPC ........ H01Q 1/3275; H01Q 21/28; H01Q 1/32; H01Q 13/10; H01Q 1/325; H01Q 1/3291; H01Q 9/30; H01Q 9/04; H01Q 1/38; H01Q 21/0006; H01Q 21/30; H01Q 5/50; H01Q 9/40; H04B 7/0413
See application file for complete search history.

(56) References Cited

U.S. PATENT DOCUMENTS

| | | | | |
|---|---|---|---|---|
| 9,543,660 | B2 * | 1/2017 | Rajagopalan | H01Q 9/045 |
| 2009/0237311 | A1 | 9/2009 | Wu et al. | |
| 2010/0302112 | A1 | 12/2010 | Lindenmeier et al. | |
| 2017/0317409 | A1 * | 11/2017 | Ayatollahi | H01Q 21/28 |
| 2020/0136239 | A1 | 4/2020 | Jeong | |
| 2024/0014561 | A1 * | 1/2024 | Sone | H01Q 5/40 |

FOREIGN PATENT DOCUMENTS

| | | | |
|---|---|---|---|
| KR | 10-2014-0007645 | A | 1/2014 |
| KR | 10-1735247 | B1 | 5/2017 |

* cited by examiner

*Primary Examiner* — Dameon E Levi
*Assistant Examiner* — Gurbir Singh
(74) *Attorney, Agent, or Firm* — Birch, Stewart, Kolasch & Birch, LLP

(57) ABSTRACT

An antenna system mounted on a vehicle according to an embodiment is provided. The antenna system comprises: a PCB on which electronic components are disposed; at least one radiator which is electrically connected to the PCB and is formed in a metal pattern having a predetermined length and width so as to transmit and receive signals; a bottom cover which is disposed below the PCB and consists of a metal plate having a slot area formed in an area corresponding to an area on which an antenna element is disposed; and a top cover which is coupled to the bottom cover and is configured to accommodate the PCB therein, wherein broadband operation is possible by means of the radiator and the metal plate having the slot area.

17 Claims, 33 Drawing Sheets

(a)

(b)

(a)

(b)

(a)

(b)

(c)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

| | |
|---|---|
| TYPE 1 (1100R-1) | TYPE 2 (1100R-2) |
| SHORT-LOOP | COUPLING MONOPOLE |
| 50% | 52% |
| 224MHz | 330MHz |
|   |   |
| TYPE 3 (1100R-3) | TYPE 4 3 (1100R-4) |
| MONOPOLE+LOOP | MONOPOLE+SLOT |
| 55% | 68% |
| 330MHz | 350MHz |
|   |   |

ANTENNA SYSTEM MOUNTED ON VEHICLE

CROSS REFERENCE TO RELATED APPLICATION

This application is the National Phase of PCT International Application No. PCT/KR2021/006884, filed on Jun. 2, 2021, which is hereby expressly incorporated by reference into the present application.

BACKGROUND

Technical Field

This specification relates to antenna system mounted on a vehicle. One particular implementation relates to an antenna system having a broadband antenna that is capable of operating in various communication systems, and to a vehicle having the same.

Discussion of the Related Art

Electronic devices may be classified into mobile/portable terminals and stationary terminals according to mobility. With commercialization of wireless communication systems that use LTE communication technologies, in recent years, the electronic devices have provided various services. In the near future, it is also expected that the electronic devices can provide various services, with commercialization of wireless communication systems that use 5G communication technologies. Meanwhile, some of LTE frequency bands may be allocated for 5G communication services.

In this regard, mobile terminals may be configured to provide 5G communication services in various frequency bands. Recently, attempts have been made to provide 5G communication services using a Sub-6 band that is a band of 6 GHz or less. In the future, however, it is also expected to provide 5G communication services by using a millimeter-wave (mmWave) band in addition to the Sub-6 band for a faster data rate.

Recently, the need to provide these communication services through a vehicle has been increased. Regarding communication services, there has also appeared a need for 5G communication services that are next-generation services, as well as for existing communication services, such as Long Term Evolution (LTE) services.

On the other hand, there is a problem in that a vehicle body and a vehicle roof are formed of a metallic material to block radio waves. Accordingly, a separate antenna structure may be disposed on a top of the vehicle body or the vehicle roof. Or, when the antenna structure is disposed on a bottom of the vehicle body or roof, a portion of the vehicle body or roof corresponding to a region where the antenna structure is disposed may be formed of a non-metallic material.

However, in terms of design, the vehicle body or roof needs to be integrally formed. In this case, the exterior of the vehicle body or roof may be formed of a metallic material. This may cause antenna efficiency to be drastically lowered due to the vehicle body or roof.

Also, the antennas mounted on the vehicle have difficulty in operating to cover an entire low band (LB).

SUMMARY

The present disclosure is directed to solving the aforementioned problems and other drawbacks. One aspect of the present disclosure is to provide an antenna structure operating to cover an entire low band (LB).

Another aspect of the present disclosure is to implement antennas for multiple input/multiple output (MIMO) as well as a backup antenna on a single antenna substrate.

Another aspect of the present disclosure is to provide a hardware configuration and a control method, capable of optimizing performance of antennas for MIMO as well as a backup antenna.

Another aspect of the present disclosure is to maintain antenna performance at a predetermined level even in case where the exterior of a vehicle body or roof is made of a metallic material.

Another aspect of the present disclosure is to utilize a ground region (area) of a body, which configures an antenna module, as an antenna.

Another aspect of the present disclosure is to improve antenna performance of an antenna system while maintaining a height of the antenna system at a predetermined level or less.

Another aspect of the present disclosure is to provide a structure for mounting an antenna system, which is capable of operating in a broad frequency band to support various communication systems, to a vehicle.

To achieve these and other advantages and in accordance with the purpose of this specification, as embodied and broadly described herein, there is provided an antenna system mounted on a vehicle. The antenna system may include: a printed circuit board (PCB) on which electronic components are disposed; at least one radiator electrically connected to the PCB, formed of a metal pattern having predetermined length and width, and configured to transmit and receive signals; a bottom cover disposed on a bottom of the PCB and configured as a metal plate having a slot region in an area adjacent to an area where the at least one radiator is connected to the PCB; and a top cover fastened to the bottom cover and configured to accommodate the PCB and the at least one radiator therein, wherein an antenna configured with the radiator and the metal plate having the slot region may operate in a broad band.

According to an embodiment, the antenna may operate in a first mode, which is a monopole mode, in a first frequency band of a low band (LB) by the radiator, and operate in a second mode, which is a slot mode, in a second frequency band higher than the first frequency band by the slot region formed on the metal plate.

According to an embodiment, the radiator may include: a feed pattern formed on the PCB; a first metal pattern operably coupled to the feed pattern and formed perpendicularly to the PCB; and a second metal pattern bent from the first metal pattern and disposed substantially parallel to the top cover.

According to an embodiment, the feed pattern may be formed of a metal pattern having a first width, and the first metal pattern may be formed to have a second width within a predetermined range from the first width in a first portion thereof connected to the feed pattern, and may be formed of a tapered metal plate having a third width wider than the second width in a second portion thereof connected to the second metal pattern.

According to an embodiment, the first metal pattern may be formed of a circular tapered metal plate, the second metal pattern may be formed of a metal plate having a predetermined length and a predetermined width, and the width of the second metal plate may be wider than or equal to the third width of the first metal plate.

According to an embodiment, the first metal pattern may be coupled to an end portion of the feed pattern through a dielectric gasket, so that a signal from the feed pattern is transferred to the first metal pattern in a coupling feed scheme.

According to an embodiment, the slot region may be disposed adjacent to the feed pattern on one side of the feed pattern, the slot region may have a first length in a first axial direction, the feed pattern may have a second length in a second axial direction perpendicular to the first axial direction, and a magnetic source formed in the slot region may be induced to an electric source formed in the feed pattern.

According to an embodiment, the antenna system may further include a TCU substrate operably coupled to one side of an antenna substrate corresponding to the PCB, the at least one radiator may include first to fourth radiators disposed on different areas of the antenna substrate corresponding to the PCB, and the processor disposed on the TCU substrate may perform multiple-input/multiple-output (MIMO) using two or more of first to fourth antennas corresponding to the first to fourth radiators.

According to an embodiment, the TCU substrate may be disposed in an empty region area the PCB, a backup antenna (BUA) may be disposed on one side surface of the TCU substrate, and the slot region may be formed in an area of the bottom cover corresponding to an area where the backup antenna is disposed.

According to an embodiment, the slot region may include first to fourth slot regions disposed adjacent to first to fourth feed patterns of the first to fourth radiators.

According to an embodiment, among the first slot region to the fourth slot region, a first type slot region formed in the area corresponding to the area where the backup antenna is disposed may be located in an area toward the TCU, and a second type slot region other than the first type slot region may be located in an area toward the antenna substrate, and the first type of slot region may be formed inside the bottom cover more inward than the second type slot region.

According to an embodiment, the antenna system may further include a switch disposed in a first type slot region formed adjacent to the area where the backup antenna is disposed and configured to electrically short the slot region, and an operating state of the switch may be changed depending on whether the backup antenna is operating.

According to an embodiment, the antenna system may further include a second switch configured to transfer a signal to one of the backup antenna and a radiator adjacent to the backup antenna, and the processor may be configured to control operations of the switch and the second switch.

According to an embodiment, the processor may control the switch to be shorted and the second switch to be connected to a first path in a first mode in which the backup antenna does not operate and a radiator disposed on the antenna substrate to be adjacent to the backup antenna operates, and control the switch to be open and the second switch to be connected to a second path in a second mode in which the radiator does not operate and the backup antenna operates.

According to an embodiment, a telematics unit formed by the bottom cover and the top cover may be disposed on a bottom of a roof of a vehicle, and an antenna including the at least one radiator and the metal plate having the slot region may radiate signals in a horizontal direction and a downward direction with respect to the roof of the vehicle.

According to an embodiment, the antenna system may further include an antenna structure configured such that at least a portion thereof is exposed to a top of a roof of a vehicle. The antenna structure may be coupled to the top cover, and configured to transmit a signal received through an antenna disposed therein to a telematics unit on a bottom of the roof.

A vehicle having an antenna system according to an embodiment is provided. The vehicle may include: a telematics module; and an antenna structure configured such that at least a portion thereof is exposed to a top of the roof. The telematics module may include: a printed circuit board (PCB) on which electronic components are disposed; at least one radiator electrically connected to the PCB, formed of a metal pattern having predetermined length and width, and configured to transmit and receive signals; a bottom cover disposed on a bottom of the PCB and formed of a metal plate having a slot region in an area adjacent to an area where the at least one radiator is connected to the PCB; and a top cover fastened to the bottom cover and configured to accommodate the PCB and the at least one radiator therein, and an antenna configured with the radiator and the metal plate having the slot region may operate in a broad band.

According to an embodiment, the telematics module may be disposed on a bottom of a roof of the vehicle, and configured to perform communication with at least one of an adjacent vehicle, a Road Side Unit (RSU), and a base station through a processor.

According to an embodiment, the radiator may include: a feed pattern formed on the PCB; a first metal pattern operably coupled to the feed pattern and formed perpendicularly to the PCB; and a second metal pattern bent from the first metal pattern and disposed substantially parallel to the top cover, the first metal pattern may be formed of a circular tapered metal plate, and the second metal pattern may be formed of a metal plate having a predetermined length and a predetermined width.

According to an embodiment, the telematics module may further include a TCU substrate operably coupled to one side of an antenna substrate corresponding to the PCB, the at least one radiator may include first to fourth radiators disposed on different areas of the antenna substrate corresponding to the PCB, and the processor disposed on the TCU substrate may perform multiple-input/multiple-output (MIMO) using two or more of first to fourth antennas corresponding to the first to fourth radiators.

According to an embodiment, the TCU substrate may be disposed in an empty area inside the PCB, a backup antenna (BUA) may be disposed on one side surface of the TCU substrate, and the slot region may be formed in an area of the bottom cover corresponding to an area where the backup antenna is disposed.

According to an embodiment, the slot region may include first to fourth slot regions disposed adjacent to first to fourth feed patterns of the first to fourth radiators. Among the first slot region to the fourth slot region, a first type slot region formed in an area corresponding to the area where the backup antenna is disposed may be located in an area toward the TCU.

According to an embodiment, a second type slot region other than the first type slot region may be located in an area toward the antenna substrate, and the first type slot region may be formed inside the bottom cover more inward than the second type slot region.

According to an embodiment, the telematics module may further include: a switch disposed in a first type slot region formed adjacent to the area where the backup antenna is disposed and configured to electrically short the slot region;

and a second switch configured to transfer a signal to one of the backup antenna and a radiator adjacent to the backup antenna.

According to an embodiment, the processor may control the switch to be shorted and the second switch to be connected to a first path in a first mode in which the backup antenna does not operate and a radiator disposed on the antenna substrate to be adjacent to the backup antenna operates, and control the switch to be open and the second switch to be connected to a second path in a second mode in which the radiator does not operate and the backup antenna operates.

Advantageous Effects of Invention

Hereinafter, technical effects of an antenna system mounted on a vehicle and the vehicle equipped with the antenna system will be described.

According to the present disclosure, an antenna can operate in a broad band by using an antenna pattern and a slot region of a ground as radiators.

According to the present disclosure, multiple-input/multiple-output (MIMO) may be performed by disposing the antenna pattern and the slot region of the ground in different areas of an antenna substrate of a radiator.

According to the present disclosure, since at least one of a backup antenna and MIMO antennas shares a slot region, the backup antenna can be disposed on an antenna substrate on which the MIMO antennas are disposed.

According to the present disclosure, performance degradation of the MIMO antennas due to a slot location change can be compensated for according to a switch and a control method.

According to the present disclosure, antenna efficiency can be improved by using the antenna pattern and the slot region of the ground as the radiators.

According to the present disclosure, an antenna can be decreased in size by using the antenna pattern and the slot region of the ground as the radiators.

According to the present disclosure, by disposing a metal sheet on an antenna structure on a bottom of a roof of a vehicle, reduction in antenna efficiency due to the roof made of a metal can be suppressed.

According to the present disclosure, even when an antenna disposed on a top of the roof of the vehicle does not operate, communication can be performed through an antenna in a module disposed on a bottom of the roof of the vehicle.

According to the present disclosure, even when multiple-input/multiple-output (MIMO) antennas in an antenna module do not normally operate, communication can be performed through the backup antenna.

Further scope of applicability of the present disclosure will become apparent from the foregoing detailed description. It should be understood, however, that the detailed description and specific examples, such as the preferred embodiment of the present disclosure, are given by way of illustration only, since various modifications and alternations within the spirit and scope of the disclosure will be apparent to those skilled in the art.

DETAILED DESCRIPTION OF THE EMBODIMENTS

Figure 1A:
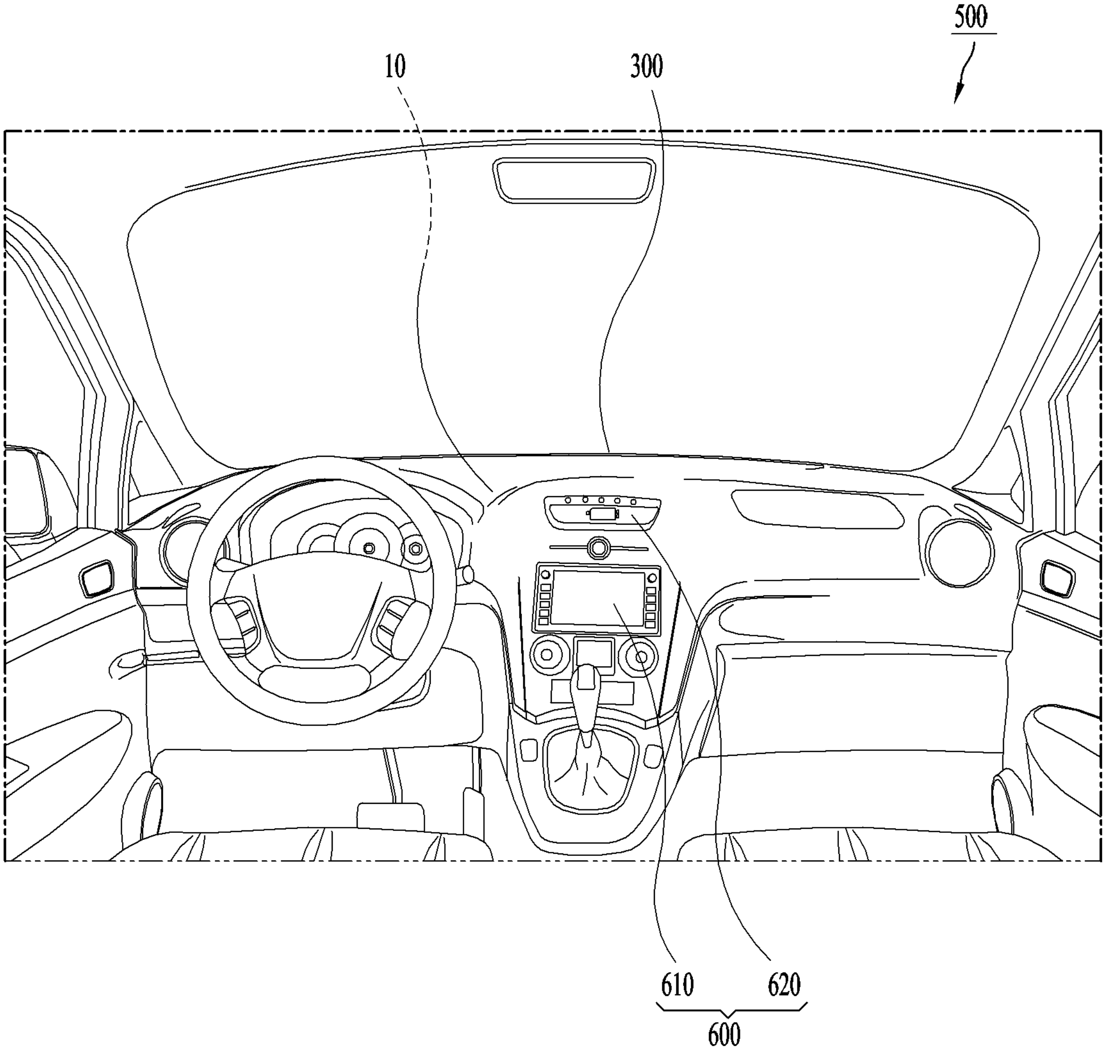
FIG. 1A is a diagram illustrating an internal configuration of a vehicle in accordance with one example.

Description will now be given in detail according to one or more embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

An electronic device described herein may include a vehicle in addition to a mobile terminal. Therefore, wireless communication through the electronic device described herein may include wireless communication through the vehicle in addition to wireless communication through the mobile terminal.

Configuration and operations according to implementations described herein may also be applied to the vehicle in addition to the mobile terminal. Configurations and operations according to implementations may also be applied to a communication system, namely, an antenna system, mounted in the vehicle. In this regard, the antenna system mounted in the vehicle may include a plurality of antennas, and a transceiver circuit and a processor that control the plurality of antennas.

The antenna system for vehicle-mounting that is mentioned in the present disclosure mostly refers to an antenna system mounted on the outside of the vehicle, but examples of the antenna system may include a mobile terminal (electronic device) mounted inside the vehicle or carried by a user who gets in the vehicle.

Figure 1B:
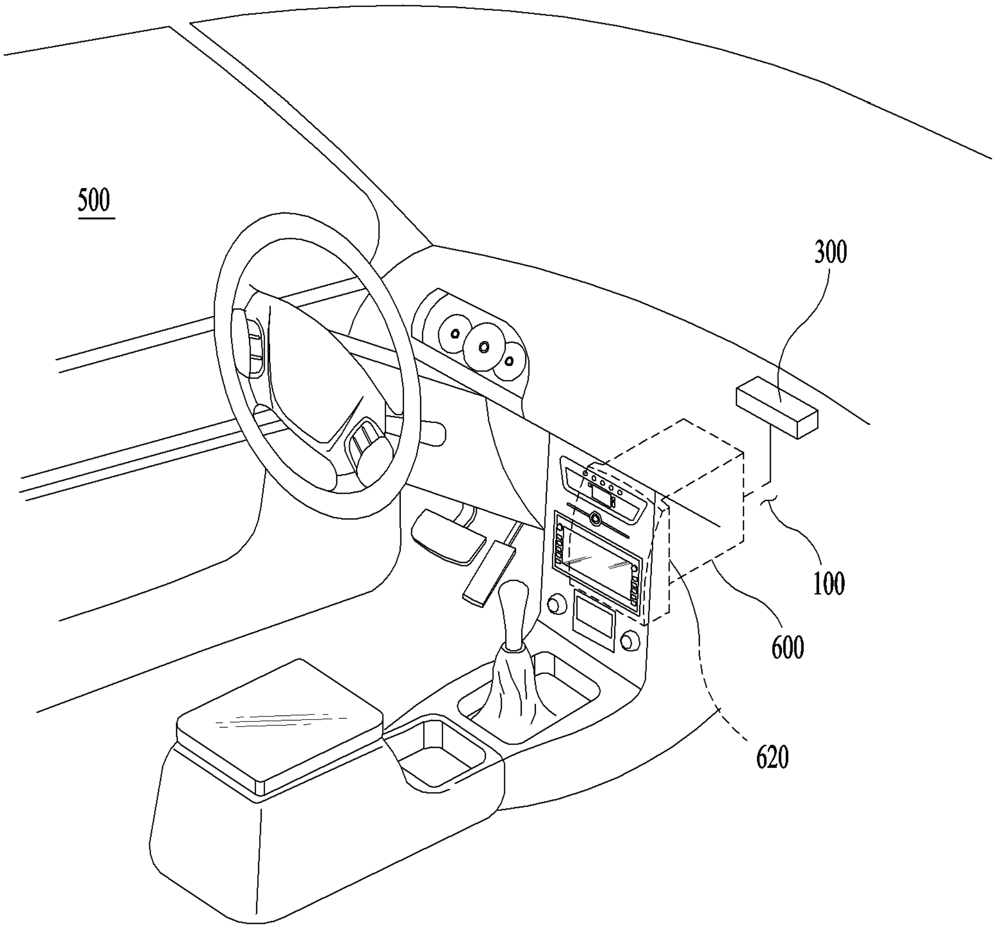
FIG. 1B is a diagram illustrating the inside of the vehicle in accordance with the one example, viewed from a side.

FIG. 1A is a diagram illustrating a vehicle interior in accordance with one example. FIG. 1B is a diagram illustrating the inside of the vehicle in accordance with the one example, viewed from a side.

As illustrated in FIGS. 1A and 1B, the present disclosure describes an antenna unit (i.e., an internal antenna system) 300 capable of transmitting and receiving signals through GPS, 4G wireless communication, 5G wireless communication, Bluetooth, or wireless LAN. Therefore, the antenna unit (i.e., the antenna system) 300 capable of supporting these various communication protocols may be referred to as an integrated antenna module 300.

The present disclosure also describes a vehicle 500 having the antenna unit 300. The vehicle 500 may include a dashboard and a housing 10 including the antenna unit 300, and the like. In addition, the vehicle 500 may include a mounting bracket for mounting the antenna unit 300.

The vehicle 500 according to the present disclosure may include the antenna module 300 corresponding to the antenna unit and a telematics unit (TCU) 600 configured to be connected to the antenna module 300. In one example, the telematics unit 600 may be configured to include the antenna module 300. The telematics unit 600 may include a display 610 and an audio unit 620.

<V2X (Vehicle-to-Everything)>

V2X communication may include communications between a vehicle and all entities, such as V2V (Vehicle-to-Vehicle) which refers to communication between vehicles, V2I (Vehicle-to-Infrastructure) which refers to communication between a vehicle and an eNB or RSU (Road Side Unit), V2P (Vehicle-to-Pedestrian) which refers to communication between a vehicle and a terminal possessed by a person (pedestrian, cyclist, vehicle driver, or passenger), V2N (vehicle-to-network), and the like.

V2X communication may have the same meaning as V2X sidelink or NR V2X or may have, in a broader sense, a meaning including V2X sidelink or NR V2X.

V2X communication can be applied to various services, for example, forward collision warning, an automatic parking assist system, cooperative adaptive cruise control (CACC), control-loss warning, traffic queuing warning, safety warning, traffic vulnerable-area safety warning, emergency vehicle warning, curved-road driving speed warning, and traffic flow control.

V2X communication may be provided through a PC5 interface and/or a Uu interface. In this case, specific network entities for supporting communications between a vehicle and all entities may exist in a wireless communication system supporting V2X communication. For example, the network entity may include a base station (eNB), a Road Side Unit (RSU), a terminal, or an application server (e.g., a traffic safety server).

In addition, a terminal performing V2X communication may refer to not only a general handheld UE but also a vehicle (V-UE), a pedestrian UE, an RSU of an eNB type, an RSU of a UE type, a robot equipped with a communication module, and the like.

V2X communication may be performed directly between terminals or may be performed through the network entity (entities). V2X operation modes may be classified according to a method of performing such V2X communication.

Terms used in V2X communication may be defined as follows.

A Road Side Unit (RSU) is a V2X service enabled device that can transmit and receive data to and from a moving vehicle using V2I service. The RSU also serves as a stationary infrastructure entity that supports V2X application programs, and may exchange messages with other entities that support V2X application programs. The RSU is a term frequently used in existing ITS specifications, and the reason for introducing this term to the 3GPP specifications is to make the documents easier to read for the ITS industry. The RSU is a logical entity that combines a V2X application logic with the functionality of an eNB (referred to as an eNB-type RSU) or a UE (referred to as a UE-type RSU).

A V2I Service is a type of V2X service, where one party is a vehicle whereas the other party is an entity belonging to an infrastructure. A V2P Service is also a type of V2X service, where one party is a vehicle and the other party is a device carried by a person (e.g., a portable terminal carried by a pedestrian, a cyclist, a driver, or an occupant other than the driver). A V2X Service is a type of 3GPP communication service that involves a transmitting or receiving device on a vehicle. The V2X service may further be divided into a V2V service, a V2I service, and a V2P service according to which partner is involved in communication for the V2X service.

V2X enabled UE is a UE that supports V2X service. The V2V Service is a type of V2X service, where both parties involved in communication are vehicles. V2V communication range is a direct communication range between two vehicles involved in the V2V service.

Figure 2A:
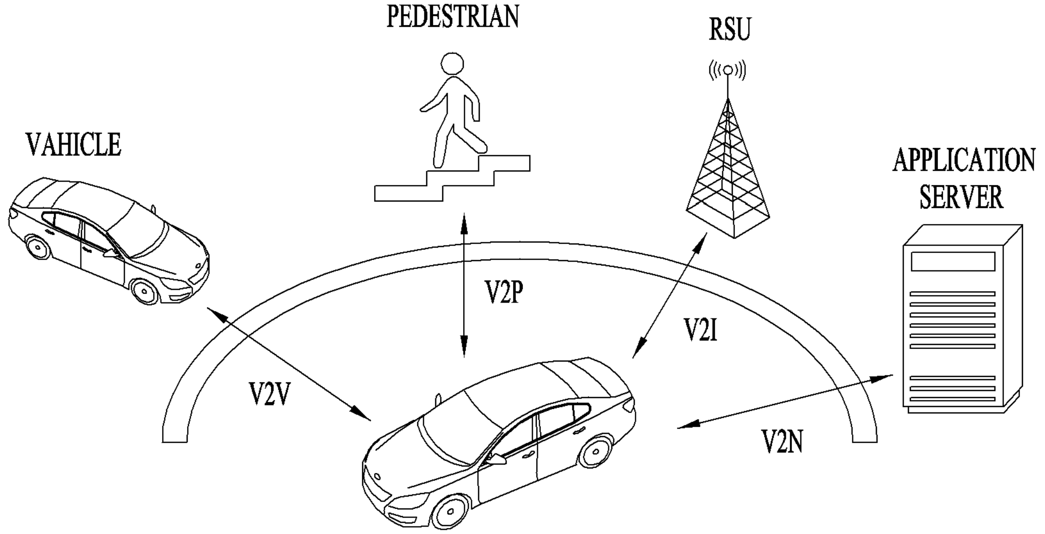
FIG. 2A is a diagram illustrating a type of V2X application.

Four types of V2X applications called Vehicle-to-Everything (V2X), as described above, include (1) vehicle-to-vehicle (V2V), (2) vehicle-to-infrastructure (V2I), (3) vehicle-to-network (V2N), (4) vehicle-to-pedestrian (V2P). FIG. 2A illustrates types of V2X applications. Referring to FIG. 2A, the four types of V2X applications may use "cooperative awareness" to provide more intelligent services for end-users.

This means that, in order to provide more intelligent information, such as cooperative collision warning or autonomous traveling, entities, such as vehicles, roadside-based facilities, application servers and pedestrians, may collect knowledge of involved local environments (e.g., information received from nearby vehicles or sensor equipment) to process and share the corresponding knowledge.

<NR V2X>

In 3GPP Releases 14 and 15, support of the V2V and V2X services in LTE has been introduced in order to extend the 3GPP platform to the automotive industry.

Requirements for support of enhanced V2X use cases are largely organized into four use case groups.

(1) Vehicles Platooning enables the vehicles to dynamically form a platoon traveling together. All the vehicles in the platoon obtain information from the leading vehicle to manage this platoon. These information allow the vehicles to drive closer than normal in a coordinated manner, going to the same direction and traveling together.

(2) Extended Sensors enable the exchange of raw or processed data gathered through local sensors or live video images among vehicles, road site units, devices of pedestrians and V2X application servers. The vehicles can increase the perception of their environment beyond of what their own sensors can detect and have a more broad and holistic view of the local situation. A high data transmission rate is one of primarily features of the extended sensor.

(3) Advanced Driving enables semi-automated or full-automated driving. Each vehicle and/or RSU shares its own perception data obtained from its local sensors with vehicles in proximity and allows vehicles to synchronize and coordinate their trajectories or maneuvers. Each vehicle shares its intention to drive with a nearby vehicle.

(4) Remote driving serves to enable a remote driver or a V2X application program to drive a remotely-located vehicle in a dangerous environment by him/herself or itself or instead of an occupant who cannot drive the remotely-located vehicle. In a case where a traffic environment is limitedly changed and a vehicle driving path is predictable such as in public transportation, driving based on cloud computing may be available. High reliability and low latency are main requirements for the remote driving.

A description to be given below may be applicable to all of NR SL (sidelink) and LTE SL, and when no radio access technology (RAT) is indicated, the NR SL is meant. Six operational scenarios considered in NR V2X may be considered as follows. In this regard, FIG. 2B illustrates a standalone scenario supporting V2X SL communication and an MR-DC scenario supporting V2X SL communication.

In particular, 1) in Scenario 1, gNB provides control/configuration for UE's V2X communication in both LTE SL and NR SL. 2) In Scenario 2, ng-eNB provides control/configuration for UE's V2X communication in both LTE SL and NR SL. 3) In Scenario 3, eNB provides control/configuration for UE's V2X communication in both LTE SL and NR SL. On the other hand, 4) in Scenario 4, the UE's V2X communication in the LTE SL and the NR SL is controlled/configured by Uu while the UE is configured with EN-DC. 5) In Scenario 5, the UE's V2X communication in the LTE SL and the NR SL is controlled/configured by Uu while the UE is configured in NE-DC. 6) In Scenario 6, the UE's V2X communication in the LTE SL and the NR SL is controlled/configured by Uu while the UE is configured in NGEN-DC.

Figure 2B:
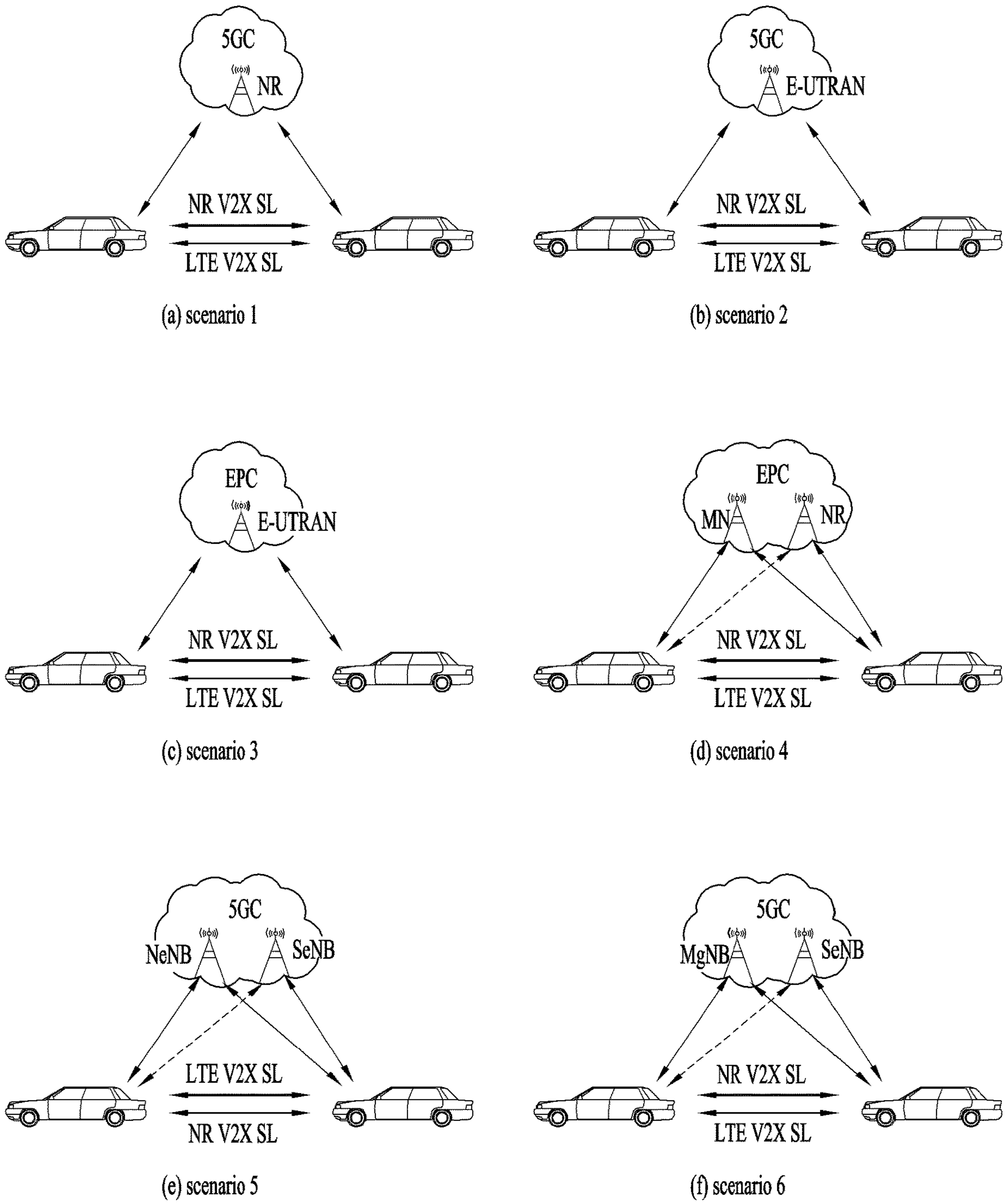
FIG. 2B illustrates a standalone scenario supporting V2X SL communication and an MR-DC scenario supporting V2X SL communication.

In order to support the V2X communication, as illustrated in FIGS. 2A and 2B, the vehicle may perform wireless communication with eNB and/or gNB through an antenna system. In this regard, the antenna system may be implemented as an external antenna system as illustrated in FIGS. 3A to 3C as well as being configured as an internal antenna system as illustrated in FIGS. 1A and 1B.

Figure 3A:
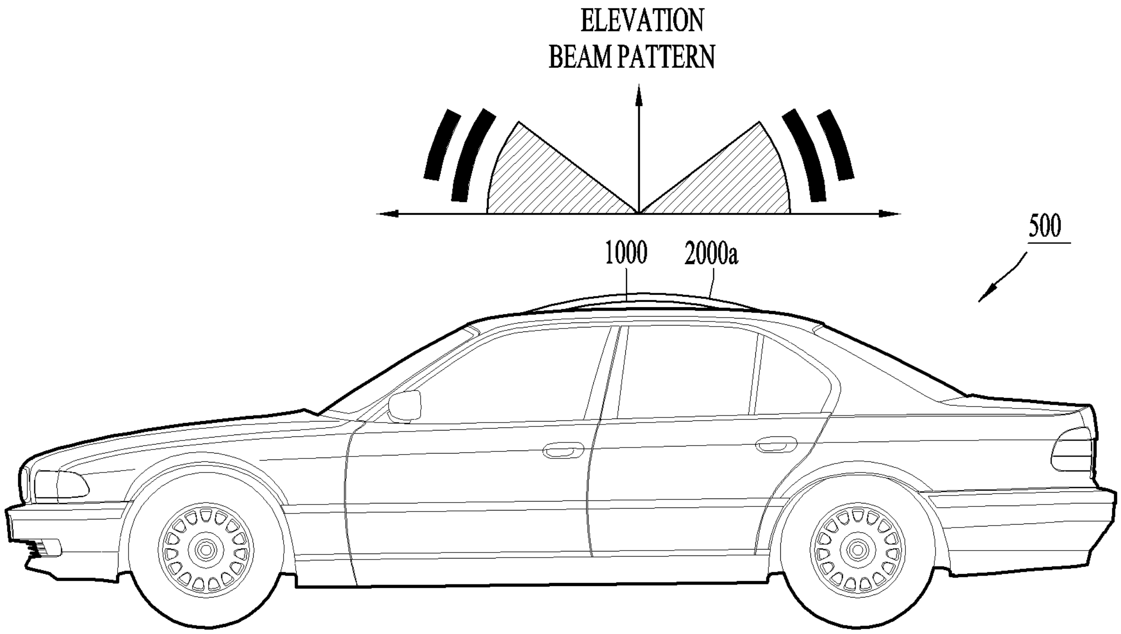
FIGS. 3A to 3C are views illustrating an example of a structure for mounting an antenna system in a vehicle, in the vehicle including the antenna system mounted in the vehicle according to the present disclosure.
Figure 3B:
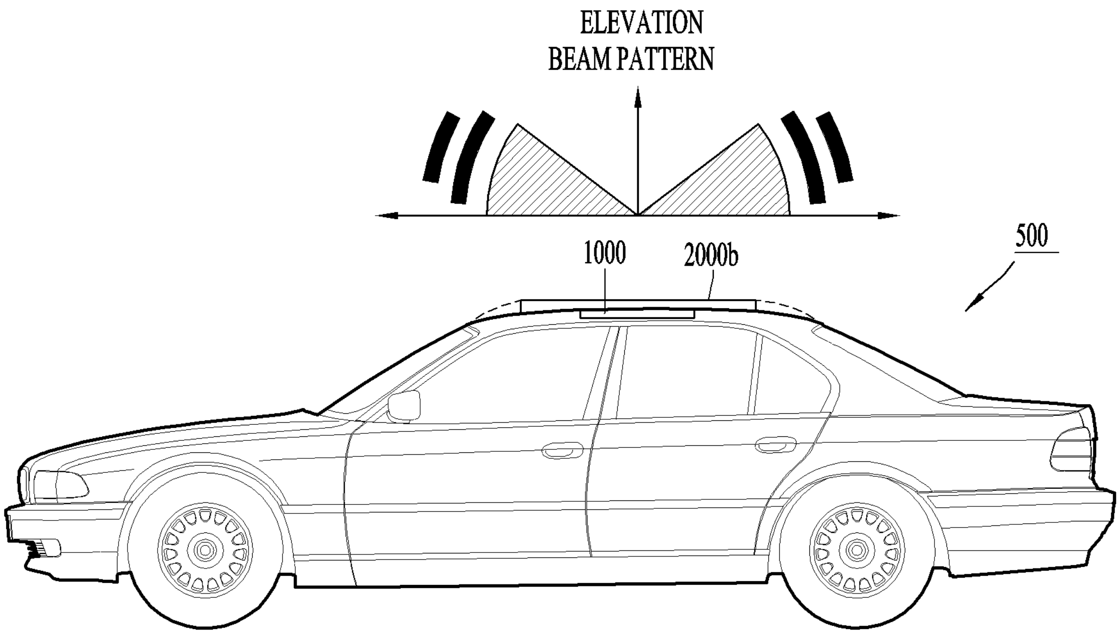
Figure 3C:
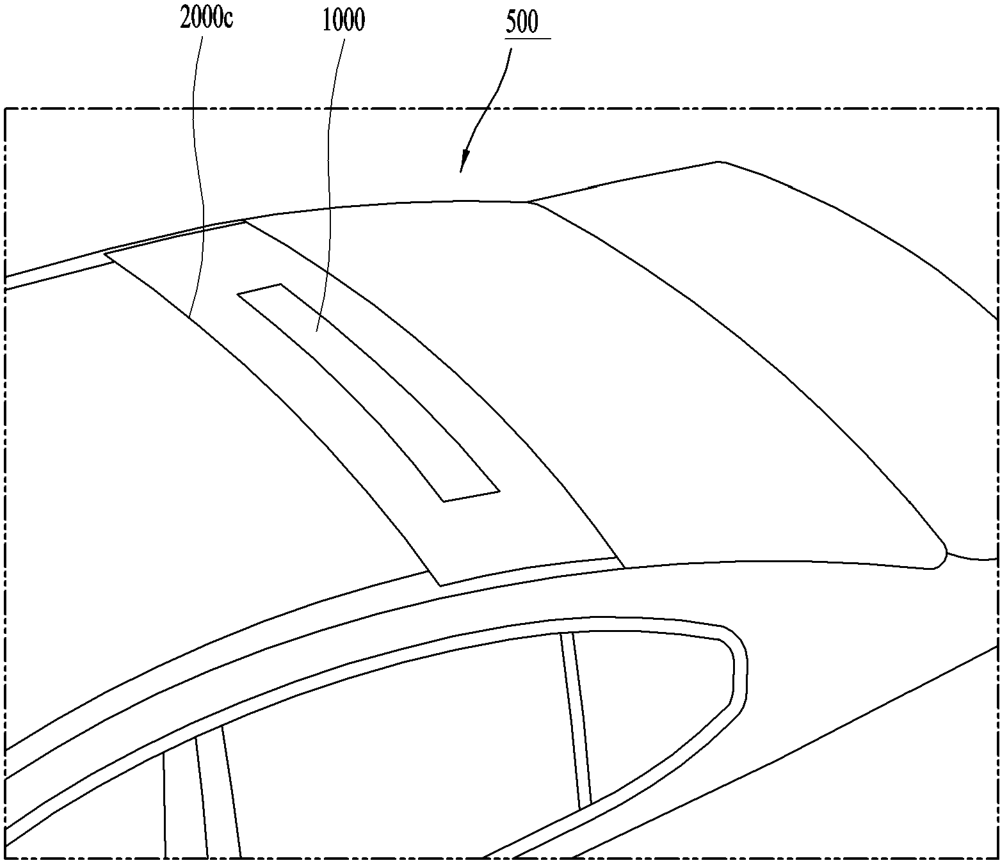

FIGS. 3A to 3C are views illustrating an example of a structure for mounting an antenna system on a vehicle, which includes the antenna system mounted on the vehicle. In this regard, FIGS. 3A and 3B illustrate a configuration in which an antenna system 1000 is mounted on or in a roof of a vehicle. Meanwhile, FIG. 3C illustrates a structure in which the antenna system 1000 is mounted on a roof of the vehicle and a roof frame of a rear mirror.

Referring to FIGS. 3A to 3C, an existing shark fin antenna is proposed to be replaced with a non-protruding flat antenna, in order to improve the appearance of the vehicle and to preserve a telematics performance when a collision takes place. In addition, the present disclosure proposes an integrated antenna of an LTE antenna and a 5G antenna considering fifth generation (5G) communication while providing the existing mobile communication service (e.g., LTE).

Referring to FIG. 3A, the antenna system 1000 may be disposed on the roof of the vehicle. In FIG. 3A, a radome 2000*a* for protecting the antenna system 1000 from an external environment and external impacts while the vehicle travels may cover the antenna system 1000. The radome 2000*a* may be made of a dielectric material through which radio signals are transmitted/received between the antenna system 1000 and a base station.

Referring to FIG. 3B, the antenna system 1000 may be disposed within a roof structure 2000*b* of the vehicle, and at least a portion of the roof structure 2000*b* may be made of a non-metallic material. At this time, the at least portion of the roof structure 2000*b* of the vehicle may be realized as the non-metallic material, and may be made of a dielectric material through which radio signals are transmitted/received between the antenna system 1000 and the base station.

Also, referring to 3C, the antenna system 1000 may be disposed within a roof frame 2000*c* of the vehicle, and at least part of the roof frame 200*c* may be made of a non-metallic material. In this case, the at least part of the roof frame 2000*c* of the vehicle 500 may be realized as the non-metallic material, and may be made of a dielectric material through which radio signals are transmitted/received between the antenna system 1000 and the base station.

Meanwhile, referring to FIGS. 3A to 3C, a beam pattern by an antenna disposed in the antenna system 1000 mounted in the vehicle needs to be formed on an upper region at a predetermined angle with respect to a horizontal region.

In this regard, a peak of an elevation beam pattern of the antenna disposed in the antenna system 1000 does not need to be formed at boresight. Therefore, the peak of the elevation beam pattern of the antenna needs to be formed on an upper region at a predetermined angle with respect to the horizontal region. For example, the elevation beam pattern of the antenna may be formed in a hemispheric shape as illustrated in FIGS. 2A to 2C.

As aforementioned, the antenna system 1000 may be installed on the front or rear surface of the vehicle other than the roof structure or roof frame of the vehicle, depending on applications. In this regard, the antenna system 1000 may correspond to an external antenna.

Meanwhile, the vehicle 500 may include only an antenna unit (i.e., internal antenna system) 300 corresponding to an internal antenna without the antenna system 1000 corresponding to an external antenna. In addition, the vehicle 500 may include both the antenna system 1000 corresponding to the external antenna and the antenna unit (i.e., the internal antenna system) 300 corresponding to the internal antenna.

Figure 4A:
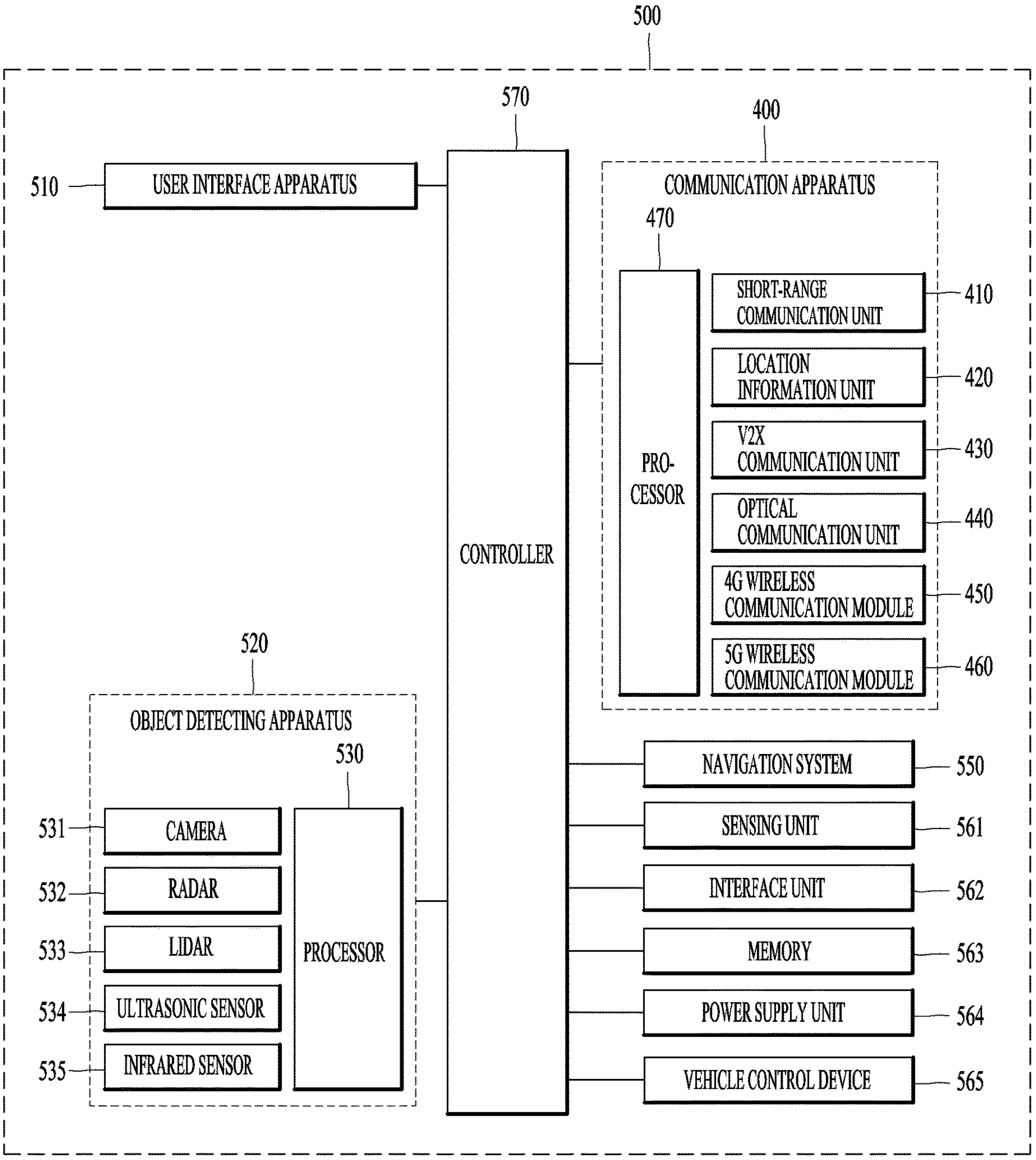
FIG. 4A is a block diagram illustrating a vehicle and an antenna system mounted to the vehicle in accordance with one embodiment.

FIG. 4 is a block diagram illustrating a vehicle and an antenna system mounted on the vehicle in accordance with an implementation.

The vehicle 500 may be an autonomous (driving) vehicle. The vehicle 500 may be switched into an autonomous driving mode or a manual mode (a pseudo driving mode) based on a user input. For example, the vehicle 500 may be switched from the manual mode into the autonomous mode or from the autonomous mode into the manual mode based on a user input received through a user interface apparatus 510.

In relation to the manual mode and the autonomous driving mode, operations such as object detection, wireless communication, navigation, and operations of vehicle sensors and interfaces may be performed by the telematics control unit mounted on the vehicle 500. Specifically, the telematics control unit mounted on the vehicle 500 may perform the operations in cooperation with the antenna module 300, the object detecting apparatus 520, and other interfaces. In some examples, the communication apparatus 400 may be disposed in the telematics control unit separately from the antenna system 300 or may be disposed in the antenna system 300.

The vehicle 500 may be switched into the autonomous mode or the manual mode based on driving environment information. The driving environment information may be generated based on object information provided by the object detecting apparatus 520. For example, the vehicle 500 may be switched from the manual mode into the autonomous driving mode or from the autonomous driving mode into the manual mode based on driving environment information generated in the object detecting apparatus 520.

For example, the vehicle 500 may be switched from the manual mode into the autonomous driving mode or from the autonomous driving mode into the manual mode based on driving environment information received through the communication apparatus 400. The vehicle 500 may be switched from the manual mode into the autonomous driving mode or from the autonomous driving mode into the manual mode based on information, data or signal provided from an external device.

When the vehicle 500 is driven in the autonomous driving mode, the autonomous vehicle 500 may be driven based on an operation system. For example, the autonomous vehicle 500 may travel based on information, data or signal generated in a driving system, a parking exit (parking-lot leaving system, and a parking system. When the vehicle 500 is driven in the manual mode, the autonomous vehicle 500 may receive a user input for driving through a driving control apparatus. The vehicle 500 may travel based on the user input received through the driving control apparatus.

The vehicle 500 may include a user interface apparatus 510, an object detecting apparatus 520, a navigation system 550, and a communication apparatus 400. The vehicle may further include a sensing unit 561, an interface unit 562, a memory 563, a power supply unit 564, and a vehicle control apparatus 565 in addition to the aforementioned apparatuses and devices. According to embodiments the vehicle 500 may include more components in addition to components to be explained in this specification or may not include some of those components to be explained in this specification.

The user interface apparatus 510 may be an apparatus for communication between the vehicle 500 and a user. The user interface apparatus 510 may receive a user input and provide information generated in the vehicle 500 to the user. The vehicle 500 may implement user interfaces (UIs) or user experiences (UXs) through the user interface apparatus 200.

The object detecting apparatus 520 may be an apparatus for detecting an object located at outside of the vehicle 500. The object may be a variety of things associated with driving (operation) of the vehicle 500. In some examples, objects may be classified into moving objects and fixed (stationary) objects. For example, the moving objects may include other vehicles and pedestrians. The fixed objects may conceptually include traffic signals, roads, and structures, for example. The object detecting apparatus 520 may include a camera 521, a radar 522, a LIDAR 523, an ultrasonic sensor 524, an infrared sensor 525, and a processor 530. In some implementations, the object detecting apparatus 520 may further include other components in addition to the components described, or may not include some of the components described.

The processor 530 may control an overall operation of each unit of the object detecting apparatus 520. The processor 530 may detect an object based on an acquired image, and track the object. The processor 530 may execute operations, such as computing of a distance to the object, computing of a relative speed with respect to the object and the like, through an image processing algorithm.

According to an embodiment, the object detecting apparatus 520 may include a plurality of processors 530 or may not include any processor 530. For example, each of the camera 521, the radar 522, the LiDAR 523, the ultrasonic sensor 524 and the infrared sensor 525 may include the processor in an individual manner.

When the processor 530 is not included in the object detecting apparatus 520, the object detecting apparatus 520 may operate according to the control of a processor of an apparatus within the vehicle 500 or the controller 570.

The navigation system 550 may provide location information related to the vehicle based on information obtained through the communication apparatus 400, in particular, a location information unit 420. Also, the navigation system 550 may provide a path (or route) guidance service to a destination based on current location information related to the vehicle. In addition, the navigation system 550 may provide guidance information related to surroundings of the vehicle based on information obtained through the object detecting apparatus 520 and/or a V2X communication unit 430. In some examples, guidance information, autonomous driving service, etc. may be provided based on V2V, V2I, and V2X information obtained through a wireless communication unit operating together with the antenna system 1000.

The communication apparatus 400 may be an apparatus for performing communication with an external device. Here, the external device may be another vehicle, a mobile terminal, or a server. The communication apparatus 400 may perform the communication by including at least one of a transmitting antenna, a receiving antenna, and radio frequency (RF) circuit and RF device for implementing various communication protocols. The communication apparatus 400 may include a short-range communication unit 410, a location information unit 420, a V2X communication unit 430, an optical communication unit 440, a broadcast transceiver 450 and a processor 470. According to an embodiment, the communication apparatus 400 may further include other components in addition to the components described, or may not include some of the components described.

The short-range communication unit 410 is a unit for facilitating short-range communications. The short-range communication unit 410 may construct short-range wireless area networks to perform short-range communication between the vehicle 500 and at least one external device. The location information unit 420 may be a unit for acquiring location information related to the vehicle 500. For example, the location information unit 420 may include a Global Positioning System (GPS) module or a Differential Global Positioning System (DGPS) module.

The V2X communication unit 430 may be a unit for performing wireless communication with a server (Vehicle to Infrastructure; V2I), another vehicle (Vehicle to Vehicle; V2V), or a pedestrian (Vehicle to Pedestrian; V2P). The V2X communication unit 430 may include an RF circuit in which protocols for communication with an infrastructure (V2I), communication between vehicles (V2V), and communication with a pedestrian (V2P) are executable. The optical communication unit 440 may be a unit for performing communication with an external device through the medium of light. The optical communication unit 440 may include an optical transmission part for converting an electric signal into an optical signal and transmitting the optical signal to the outside, and an optical reception part for converting the received optical signal into the electric signal. According to an embodiment, the optical transmission part may be formed integrally with lamps provided on the vehicle 500.

The wireless communication unit 460 is a unit that performs wireless communication with one or more communication systems through one or more antenna systems. The wireless communication unit 460 may transmit and/or receive a signal to and/or from a device in a first communication system through a first antenna system. In addition, the wireless communication unit may transmit and/or receive a signal to and/or from a device in a second communication system through a second antenna system. For example, the first communication system and the second communication system may be an LTE communication system and a 5G communication system, respectively. However, the first communication system and the second communication system may not be limited thereto, and may be changed according to applications.

In some examples, the antenna module 300 disposed in the vehicle 500 may include a wireless communication unit. In this regard, the vehicle 500 may be an electric vehicle (EV) or a vehicle that can be connected to a communication system independently of an external electronic device. In this regard, the communication apparatus 400 may include at least one of the short-range communication unit 410, the location information unit 420, the V2X communication unit 430, the optical communication unit 440, a 4G wireless communication module 450, and a 5G wireless communication module 460.

The 4G wireless communication module 450 may perform transmission and reception of 4G signals with a 4G base station through a 4G mobile communication network. In this case, the 4G wireless communication module 450 may transmit at least one 4G transmission signal to the 4G base station. In addition, the 4G wireless communication module 450 may receive at least one 4G reception signal from the 4G base station. In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 460 may perform transmission and reception of 5G signals with a 5G base station through a 5G mobile communication network. Here, the 4G base station and the 5G base station may have a Non-Stand-Alone (NSA) architecture. The 4G base station and the 5G base station may be disposed in the Non-Stand-Alone (NSA) architecture. Alternatively, the 5G base station may be disposed in a Stand-Alone (SA) architecture at a separate location from the 4G base station. The 5G wireless communication module 460 may perform transmission and reception of 5G signals with a 5G base station through a 5G mobile communication network. In this case, the 5G wireless communication module 460 may transmit at least one 5G transmission signal to the 5G base station. In addition, the 5G wireless communication module 460 may receive at least one 5G reception signal from the 5G base station. In this instance, a 5G frequency band that is the same as a 4G frequency band may be used, and this may be referred to as LTE re-farming. In some examples, a Sub-6 frequency band that is a band of 6 GHz or less may be used as the 5G frequency band. In contrast, a millimeter-wave (mmWave) band may be used as the 5G frequency band to perform wideband high-speed communication. When the mmWave band is used, the electronic device may perform beamforming for coverage expansion of an area where communication with a base station is possible.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

In some examples, the wireless communication unit 110 may be in a Dual Connectivity (DC) state with the 4G base station and the 5G base station through the 4G wireless communication module 450 and the 5G wireless communication module 460. As such, the dual connectivity to the 4G base station and the 5G base station may be referred to as EUTRAN NR DC (EN-DC). When the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 450 and the 5G wireless communication module 460, respectively. Short-range communication between electronic devices (e.g., vehicles) may be performed between electronic devices (e.g., vehicles) using the 4G wireless communication module 450 and the 5G wireless communication module 460. In one embodiment, after resources are allocated, vehicles may perform wireless communication in a V2V manner without a base station.

Meanwhile, for transmission rate improvement and communication system convergence, Carrier Aggregation (CA) may be carried out using at least one of the 4G wireless communication module 450 and the 5G wireless communication module 460 and a WiFi communication module. In this regard, 4G+WiFi CA may be performed using the 4G wireless communication module 450 and the Wi-Fi communication module. Or, 5G+WiFi CA may be performed using the 5G wireless communication module 460 and the Wi-Fi communication module 113.

Meanwhile, the communication apparatus 400 may implement a display apparatus for a vehicle together with the user interface apparatus 510. In this instance, the display apparatus for the vehicle may be referred to as a telematics apparatus or an Audio Video Navigation (AVN) apparatus.

Figure 4B:
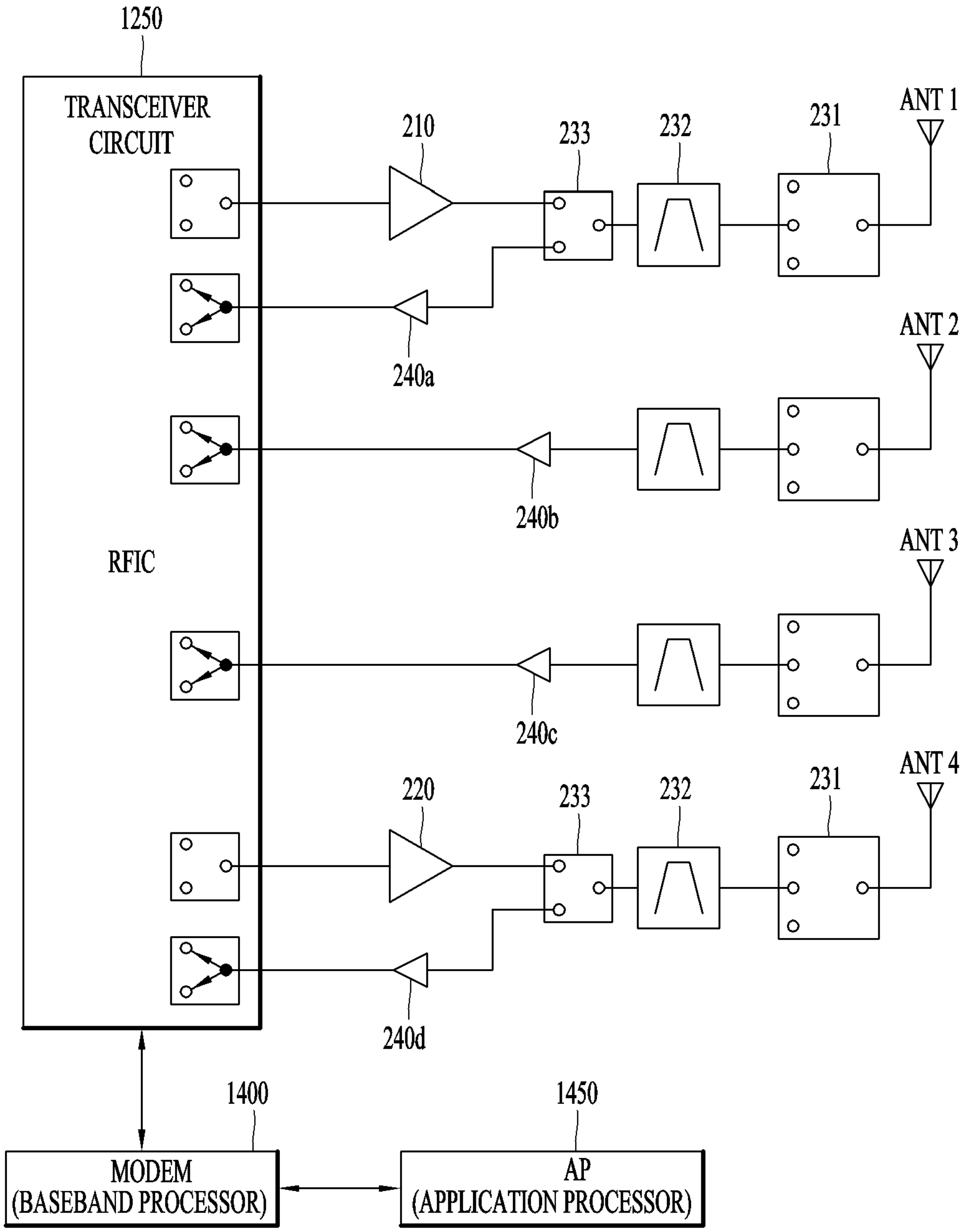
FIG. 4B is a block diagram illustrating an exemplary configuration of a wireless communication unit of a vehicle that can operate in a plurality of wireless communication systems.

FIG. 4B is a block diagram illustrating an exemplary configuration of a wireless communication unit of a vehicle that can operate in a plurality of wireless communication systems. Referring to FIG. 4B, the vehicle may include a first power amplifier 210, a second power amplifier 220, and an RFIC 1250. In addition, the vehicle may further include a modem 1400 and an application processor (AP) 1450. Here, the modem 1400 and the application processor (AP) 1450 may be physically integrated into a single chip, to be logically and functionally separated from each other. However, the modem 1400 and the AP 1450 are not limited thereto and may be realized in the form of chips that are separated physically from each other, depending on application.

Meanwhile, the vehicle may include a plurality of low noise amplifiers (LNAs) 240*a* to 240*d* in the reception unit. Here, the first power amplifier 210, the second power amplifier 220, the RFIC 1250, and the plurality of low noise amplifiers 240*a* to 240*d* may all operate in the first communication system and the second communication system. In this case, the first communication system and the second communication system may be a 4G communication system and a 5G communication system, respectively.

As illustrated in FIG. 4, the RFIC 1250 may be integrally configured to serve for 4G and 5G, but may not be limited thereto. The RFIC 250 may be configured to be separable into two parts, one for 4G and the other for 5G, depending on application. When the RFIC 1250 is integrally configured to serve for 4G and 5G, this configuration may be advantageous in terms of synchronization between 4G and 5G circuits as well as simplification of control signaling by the modem 1400.

On the other hand, when the RFIC 1250 is separable into two parts for 4G and 5G, respectively, these two parts may be referred to as a 4G RFIC and a 5G RFIC, respectively. In particular, when there is a great difference between the 5G band and the 4G band, such as when the 5G band is configured as a millimeter wave band, the RFIC 1250 may be configured to be separable into two parts for 4G and 5G, respectively. Even when the RFIC 1250 is separable into two parts for 4G and 5G, the 4G RFIC and the 5G RFIC may be logically and functionally separated from each other but physically integrated, as SoC (System on Chip), into one chip. On the other hand, the application processor (AP) 1450 may be configured to control the operation of each component of the electronic device. Specifically, the application processor (AP) 1450 may control the operation of each component of the electronic device through the modem 1400.

Meanwhile, the first power amplifier 210 and the second power amplifier 220 may operate in at least one of the first and second communication systems. In this regard, when the 5G communication system operates in a 4G band or a Sub 6 band, the first and second power amplifiers 210 and 220 can operate in both the first and second communication systems. On the other hand, when the 5G communication system operates in a millimeter wave (mmWave) band, one of the first and second power amplifiers 210 and 220 may operate in the 4G band and the other in the millimeter-wave band.

On the other hand, two different wireless communication systems may be implemented with one antenna using an antenna that serves for both transmission and reception by integrating a transmission unit and a reception unit. In this case, 4×4 MIMO may be implemented using four antennas as illustrated in FIG. 2. In this case, 4×4 DL MIMO may be performed through downlink (DL).

Meanwhile, when the 5G band is a sub-6 band, first to fourth antennas ANT1 to ANT4 may be configured to operate in both the 4G band and the 5G band. On the contrary, when the 5G band is the millimeter wave (mmWave) band, the first to fourth antennas ANT1 to ANT4 may be configured to operate in one of the 4G band and the 5G band. In this case, when the 5G band is the millimeter wave (mmWave) band, each of the plurality of antennas may be configured as an array antenna in the millimeter wave band. Meanwhile, 2×2 MIMO may be implemented using two antennas connected to the first power amplifier 210 and the second power amplifier 220 among the four antennas. In this case, 2×2 UL MIMO (2 Tx) may be performed through uplink (UL).

In addition, the vehicle that is operable in the plurality of wireless communication systems according to an implementation may further include a duplexer 231, a filter 232, and a switch 233. The duplexer 231 may be configured to separate signals into a signal in a transmission band and a signal in a reception band. In this case, the signals in the transmission band that are transmitted through the first and second power amplifiers 210 and 220 are applied to the first and fourth antennas ANT1 and ANT4, respectively, through a first output port of the duplexer 231. On the contrary, the signals in the reception band that are received through the first and fourth antennas ANT1 and ANT4 are received into the low noise amplifiers 240*a* and 240*d*, respectively, through a second output portion of the duplexer 231. The filter 232 may be configured to allow a signal in the transmission band or the reception band to pass through and to block a signal in a band other than the transmission band and the reception band. The switch 233 may be configured to transmit only one of a transmission signal and a reception signal.

The vehicle according to the present disclosure may further include a modem 1400 corresponding to the controller. In this case, the RFIC 1250 and the modem 1400 may be referred to as a first controller (or a first processor) and a second controller (a second processor), respectively. The RFIC 1250 and the modem 1400 may be implemented as physically separated circuits. Alternatively, the RFIC 1250 and the modem 1400 may be logically or functionally distinguished from each other on one physical circuit. The modem 1400 may perform control and signal processing for signal transmission and reception through different communication systems using the RFID 1250. The modem 1400 may acquire control information from a 4G base station and/or a 5G base station. Here, the control information may be received through a physical downlink control channel (PDCCH), but may not be limited thereto.

The modem 1400 may control the RFIC 1250 to transmit and/or receive signals through the first communication system and/or the second communication system for a specific time interval and from frequency resources. Accordingly, the vehicle can be allocated resources or maintain a connected state through the eNB or gNB. In addition, the vehicle may perform at least one of V2V communication, V2I communication, and V2P communication with other entities using the allocated resources.

Meanwhile, referring to FIGS. 1A to 4B, the antenna system mounted to the vehicle may be disposed inside the vehicle, on the roof of the vehicle, inside the roof, or inside the roof frame. In this regard, the antenna system disclosed herein may be configured to operate in a low band (LB), mid band (MB), and high band (HB) of a 4G LTE system and a SUB6 band of a 5G NR system.

Figure 5A:
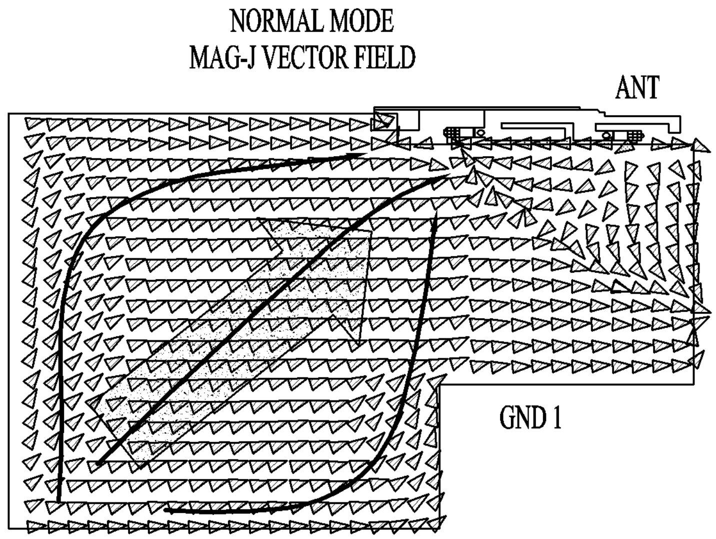
FIG. 5A is a view of comparing an operation principle of a ground boosting antenna of an antenna system according to the present disclosure with that of an antenna in a normal mode.
Figure 5A:
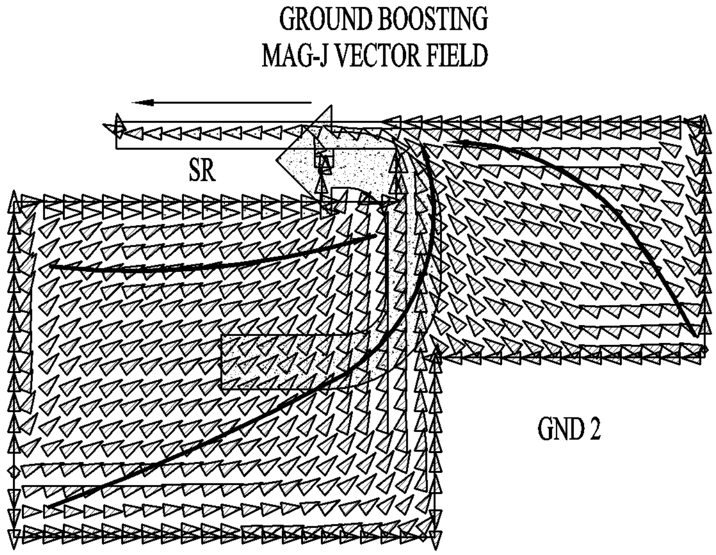

FIG. 5A is a view of comparing an operation principle of a ground boosting antenna of an antenna system according to the present disclosure with that of an antenna in a normal mode. Referring to (a) of FIG. 5A, a current distribution formed in a ground GND1 when an antenna ANT operates in a normal mode is shown. When the antenna ANT operates in the normal mode, current distribution intensity is highest in a region adjacent to the antenna ANT. Therefore, the current is formed in the ground GND1 toward a region where the antenna ANT is disposed. Accordingly, the antenna ANT operates as a main radiator and the ground GND1 operates as a ground for the antenna.

On the other hand, referring to (b) of FIG. 5A, a current distribution formed in a ground GND2 when the antenna ANT operates in a ground boosting mode is shown. When operating in the ground boosting mode, the largest current distribution appears in a slot region SR formed in the ground GND2. When the antenna ANT operates in the ground boosting mode, current distribution intensity is highest in a region adjacent to the slot region SR. Therefore, the current is formed in the ground GND2 toward a region where the slot region SR is disposed. Accordingly, the slot region SR operates as a main radiator, and a feed antenna feeding the slot region SR operates as an auxiliary radiator. As a current path is formed toward the region adjacent to the slot region SR, the length of the current path may increase, thereby increasing antenna efficiency in the low band. In addition, since the length of the current path increases, the size of the antenna can be reduced.

In this regard, when an antenna pattern is disposed in a limited space inside a Telemetric Control Unit (TCU) of the vehicle, it is difficult to secure antenna performance due to the limitation of the disposition space. In this regard, a communication system supported by the vehicle is expanded, and the number of components mounted on a PCB inside the TCU increases. Accordingly, a disposition space of antennas that may be disposed inside the TCU is reduced. A ground boosting antenna according to the present disclosure is involved in an antenna technology that utilizes not only an antenna pattern but also a ground body as antenna radiators.

Figure 5B:
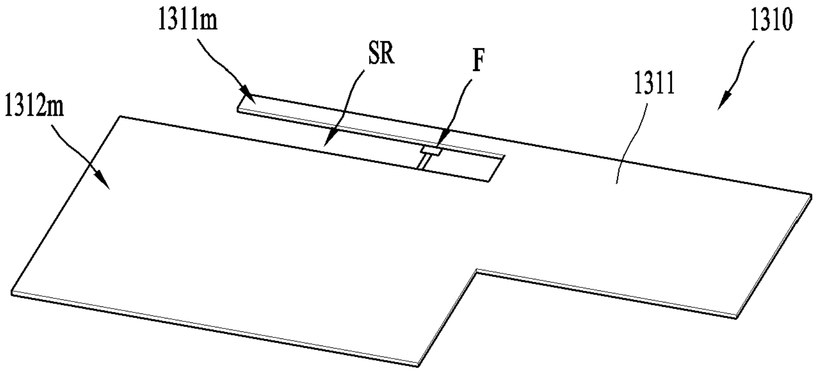
FIG. 5B is a view illustrating different structures of radiators each made of a metal plate with a slot region.
Figure 5B:
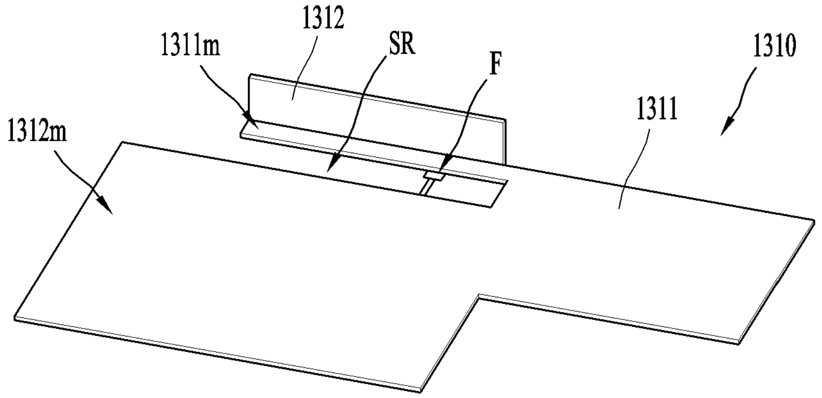

FIG. 5B is a view illustrating different structures of radiators each made of a metal plate with a slot region. (a) of FIG. 5B is a view illustrating a structure of a radiator that includes a metal plate 1311 having a slot region. Referring to (a) of FIG. 5B, a ground radiator may be implemented in the slot region SR through a feeder F. The ground radiator may be a bottom cover 1310 of the antenna system, but is not limited thereto.

(b) of FIG. 5B shows a metal structure 1312 extending from an outer side of the metal plate 1311 forming the slot region. Referring to (b) of FIG. 5B, a resonant frequency of the ground radiator corresponding to the antenna can be adjusted by extending a wall made of a metal around the slot region of the ground. Since the ground region is expanded by the metal structure 1312, the resonant frequency may move to a low frequency band. The metal structure 1312 may be a vertical metal structure formed vertical to the metal plate 1311, but is not limited thereto. The metal structure 1312 may be formed at a predetermined angle with the metal plate 1311. Accordingly, the metal structure 1312 may be referred to as a vertical metal structure 1312 or a bent portion 1312.

Referring to FIG. 5B, the slot region SR may be defined as a region between a first metal portion 1311*m* and a second metal portion 1312*m*. A length of the first metal portion 1311*m* formed outside the slot region SR may be shorter than or equal to a length of the second metal portion 1312*m* formed inside the slot region SR1, but is not limited thereto. For example, the length of the first metal portion 1311*m* may be substantially the same as a length of the metal structure 1312. The length of the metal structure 1312 may be substantially equal to or longer than a length of an antenna element.

Figure 5C:
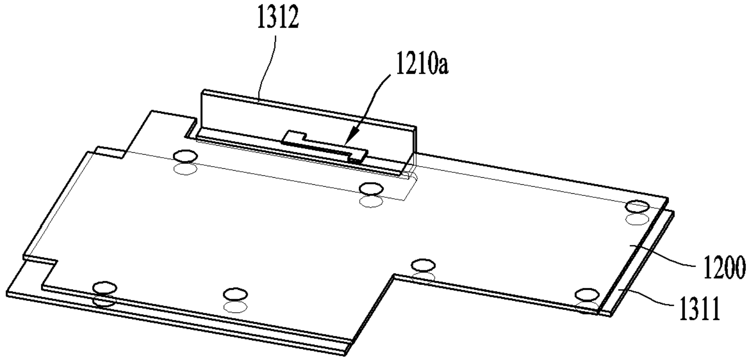
FIG. 5C is a view illustrating a structure according to a shape of a feeding path defined in a PCB 1200 disposed on a top of a metal plate 1311, and a structure with an upper ground 1400.
Figure 5C:
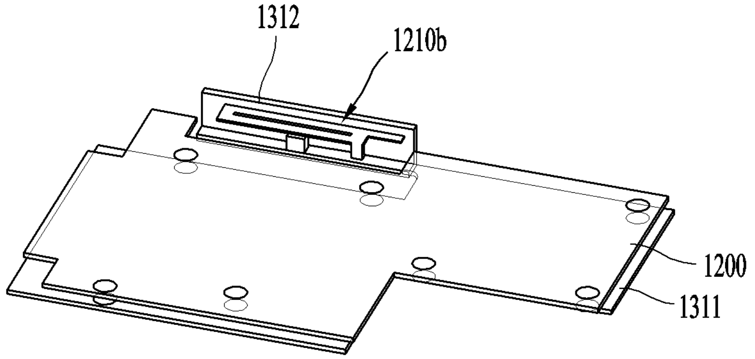
Figure 5C:
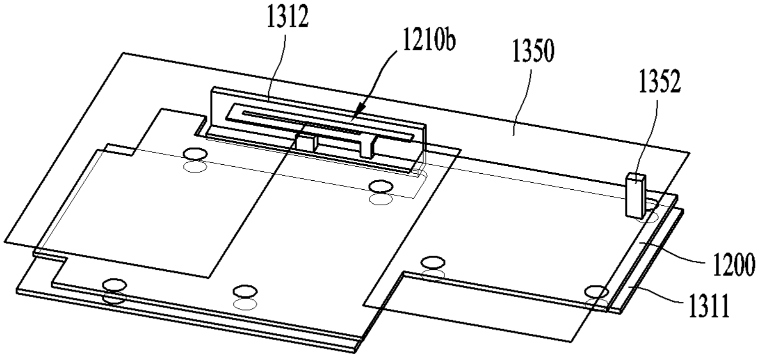

FIG. 5C is a view illustrating a structure according to a shape of a feeding path defined in a PCB 1200 disposed on a top of a metal plate 1311, and a structure with an upper ground 1400. (a) of FIG. 5C shows an antenna element 1210*a* implemented as a feeder on a PCB 1200 disposed on a top of the metal plate 1311. In this regard, the antenna element 1210*a* may operate as a first radiator and the metal plate 1311 having the slot region may operate as a second radiator. The antenna element 1210*a* may be formed in a planar structure. Accordingly, the antenna element 1210*a* may be disposed on a plane without being formed in a three-dimensional structure on a separate dielectric carrier. Accordingly, the antenna element 1210*a* may alternatively be configured as a conductive pattern and disposed on the PCB 1200.

(b) of FIG. 5C shows an antenna element 1210*b* formed on a dielectric carrier DC on the PCB 1200 disposed on the top of the metal plate 1311. In this regard, the antenna element 1210*b* may operate as a first radiator and the metal plate 1311 having the slot region may operate as a second radiator.

(c) of FIG. 5C shows a structure in which a metal sheet 1350 is disposed on a top of the PCB 1200 disposed on the top of the metal plate 1311. In order to optimize antenna efficiency and resonant frequency characteristics by the metal sheet 1350, the metal sheet 1350 may be electrically connected to the ground through a ground connection portion 1352. For example, the metal sheet 1350 may be electrically connected to the ground of the PCB 1200 through the ground connection portion 1352. The antenna element 1210*b* is illustrated as being formed on the dielectric carrier DC on the PCB 1200, but is not limited thereto. As illustrated in (a) of FIG. 5C, the antenna element 1210*a* may be formed to be coupled to the PCB 1200 disposed on the top of the metal plate 1311.

Meanwhile, the antenna elements of (a) and (b) of FIG. 5C may be referred to as a first type antenna element 1210*a* and a second type antenna element 1210*b*, respectively. The first type antenna element 1210*a* may have a radiation portion implemented with a single conductive pattern. On the other hand, the second type antenna element 1210*b* may be implemented with a plurality of conductive patterns in which radiating portions are spaced apart at predetermined distances. Accordingly, the second type antenna element 1210*b* may be disposed within a limited region of the PCB 1200 compared to the first type antenna element 1210*a*.

Referring to FIGS. 5B and 5C, the radiator that operates as the antenna may include the antenna element 1210*a*, 1210*b* that includes the slot region SR of a feed connection portion F and a ground, and the conductive pattern. A slot mode radiator operated by current formed in the slot region SR of the ground mainly operates in a band less than 1 GHz. On the other hand, the radiator operated by current formed in the conductive pattern of the antenna element 1210*a*, 1210*b* generates an additional resonance mode in a band of 1 GHz or higher.

The Present Disclosure

The antenna having the ground boosting structure including the slot region SR of the ground and the conductive pattern may be configured in various ways. In this regard, the present disclosure proposes a structure in which an antenna having a ground boosting structure is applied to a radiator structure for multiple-input/Multiple-output (MIMO) and a structure applied to a backup antenna BUA.

Figure 6:
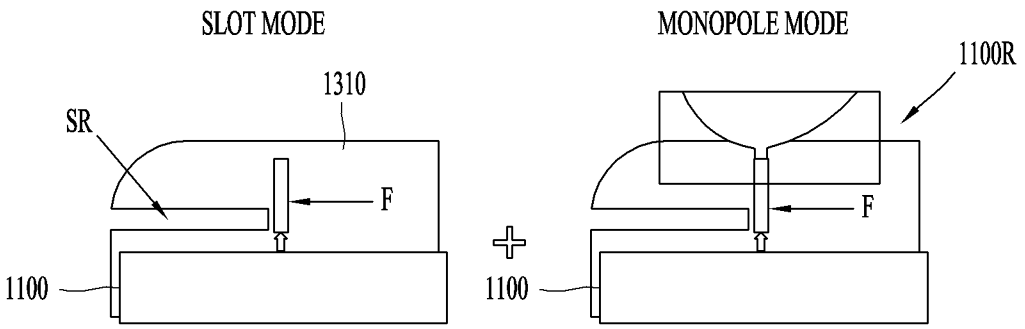
FIG. 6 is a view illustrating a radiator structure operating in a dual mode according to an embodiment and a proposed structure according to the radiator structure.
Figure 6:
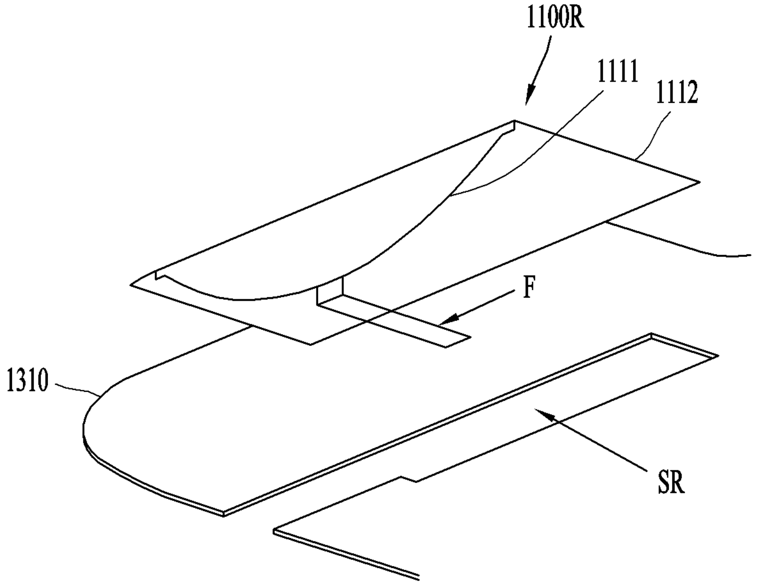

FIG. 6 is a view illustrating a radiator structure operating in a dual mode according to an embodiment and a proposed structure according to the radiator structure. (a) of FIG. 6 shows a structure of a radiator operating in a dual mode of a ground boosting structure. On the other hand, (b) of FIG. 6 shows a structure including a radiator and a slot region according to the present disclosure.

Figure 7:
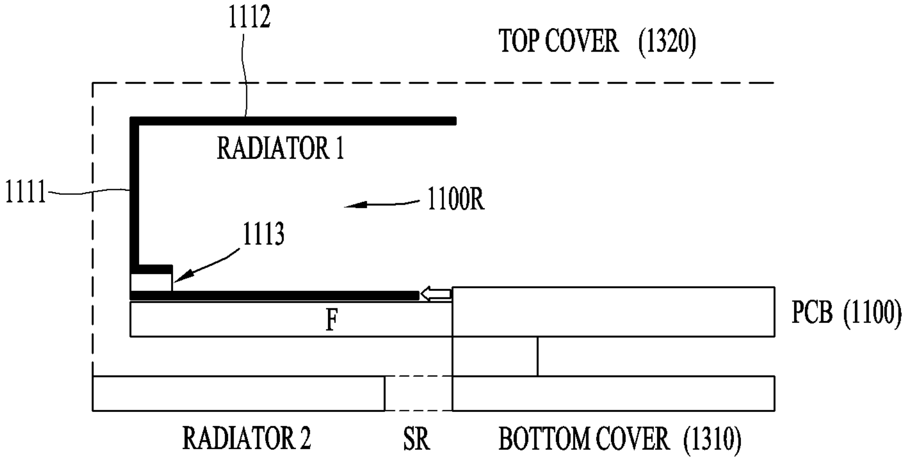
FIG. 7 shows a lateral view of an antenna system including a top cover, a bottom cover, and a radiator disposed therebetween, and a lateral view of a connection structure between the radiator and a feeder.
Figure 7:
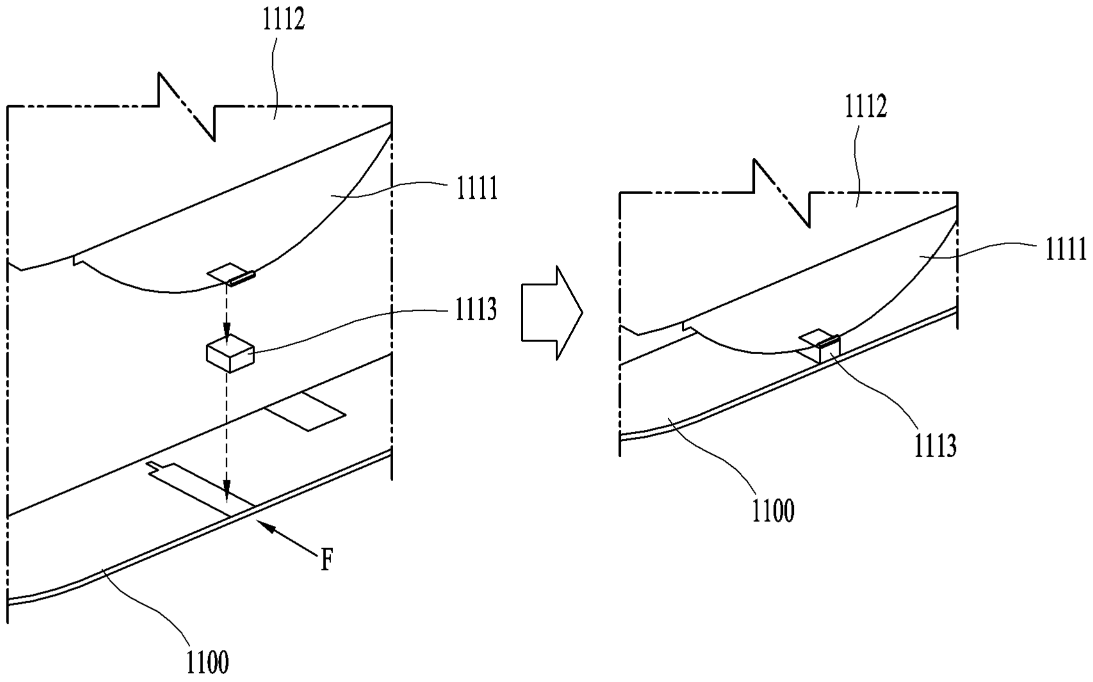

FIG. 7 shows a lateral view of an antenna system including a top cover, a bottom cover, and a radiator disposed therebetween, and a lateral view of a connection structure between the radiator and a feeder. (A) of FIG. 7 is a lateral view of the antenna system including the top cover, the bottom cover, and the radiator disposed therebetween. (b) of FIG. 7 is a lateral enlarged view illustrating a connection structure of the radiator and a feeder in the antenna system including the top cover, the bottom cover, and the radiator disposed therebetween.

Figure 8:
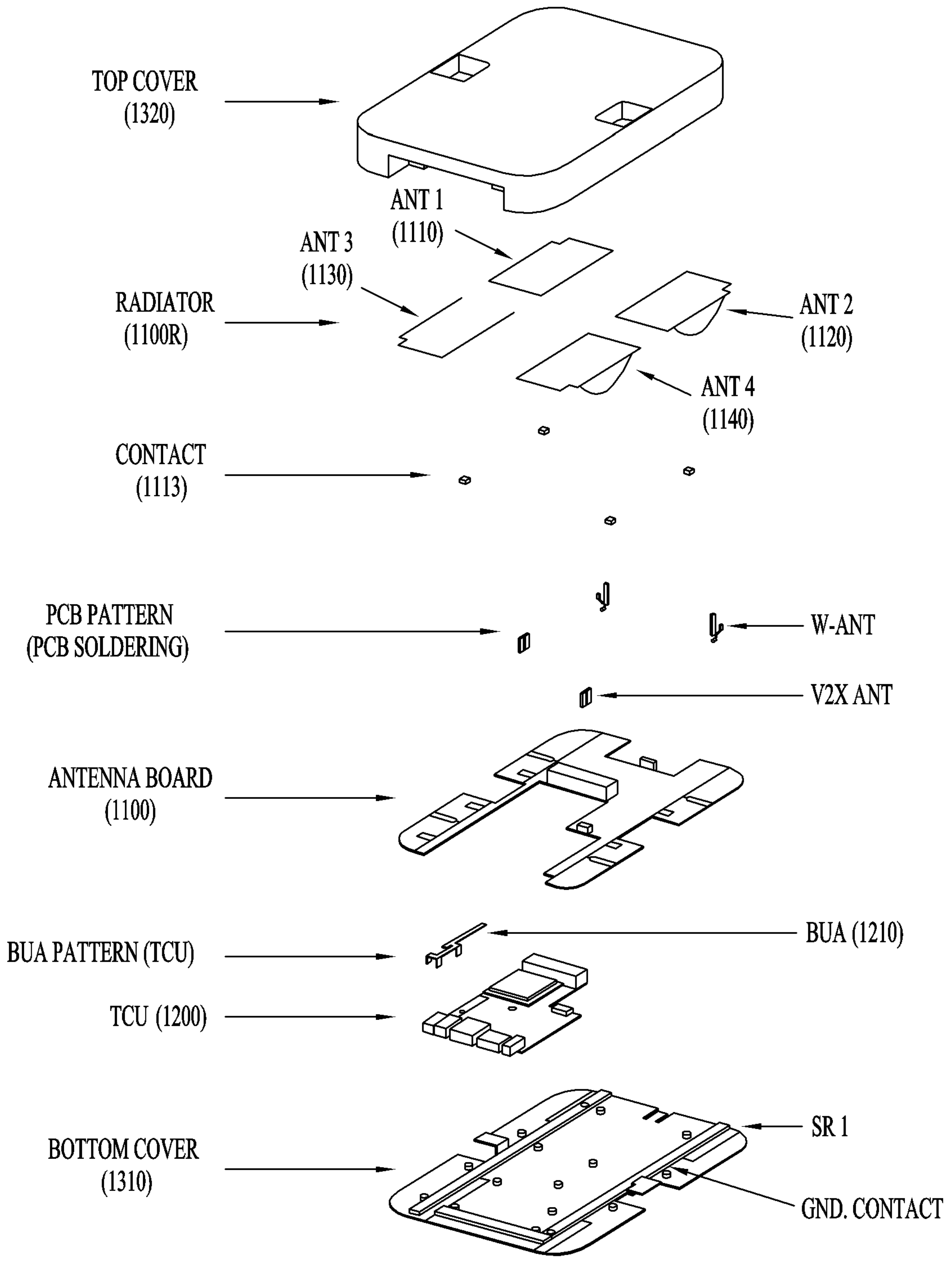
FIG. 8 is an exploded view of an antenna system including a top cover, a bottom cover, and a radiator disposed therebetween according to an embodiment.

FIG. 8 is an exploded view of the antenna system including the top cover, the bottom cover, and the radiator disposed therebetween according to the embodiment. Referring to FIGS. 6 to 8, an antenna system mounted on a vehicle according to an embodiment may include at least one radiator 1100R, a bottom cover 1310, and a top cover 1320. The antenna system is not limited to this configuration, and may be configured to include a PCB 1100, at least one radiator 1100R, a bottom cover 1310, and a top cover 1320. Here, the PCB 1100 corresponds to an antenna substrate 1100 on which the at least one radiator 1100R is disposed. Meanwhile, a separate PCB corresponding to a TCU substrate 1200 may be disposed in an empty region inside the antenna substrate 1100.

Electronic components may be disposed on the PCB 1100. The at least one radiator 1100R and the electronic components may be disposed on the PCB 1100. When MIMO is performed through the antenna system, a plurality of radiators 1110 to 1140 and the electronic components may be disposed on the PCB 1100. In this regard, the at least one radiator 1100R may be configured to include the first radiator (ANT1) 1110 to the fourth radiator (ANT4) 1140, but the number of radiators is not limited thereto. Depending on applications, the number of radiators may be changed to 2, 4, 6, 8 or the like.

The at least one radiator 1100R may be electrically connected to the PCB 1100 and configured as a metal pattern having predetermined length and width to transmit and receive signals.

The bottom cover 1310 may be configured as a metal plate disposed on a bottom of the PCB 1100 and having the slot region SR formed in a region adjacent to a region where the radiator 1100R is connected to the PCB 1100. The top cover 1320 may be configured to be coupled to the bottom cover 1310 so as to accommodate the PCB 1100 and the at least one radiator 1100R therein. Meanwhile, a broadband operation may be performed by the metal plate on which the radiator 1100R and the slot region SR are formed.

Figure 9:
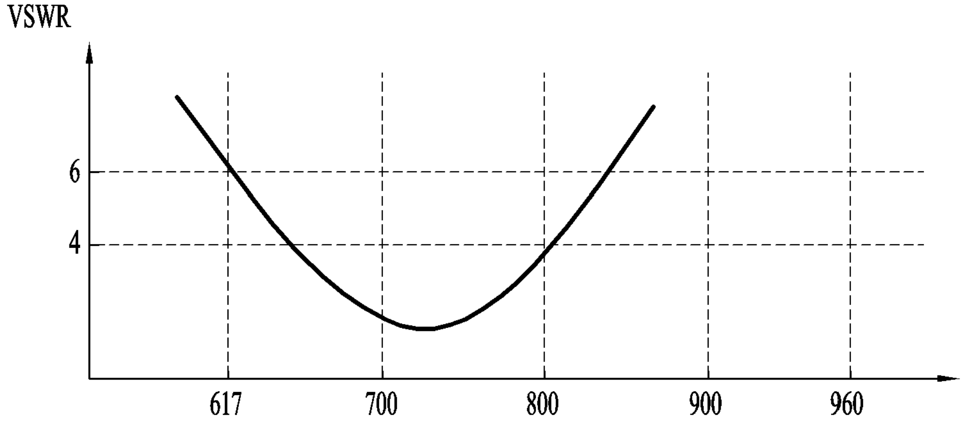
FIG. 9 is view showing a comparison result of VSWR characteristics between an antenna implemented in a single mode and an antenna implemented in a dual mode.
Figure 9:
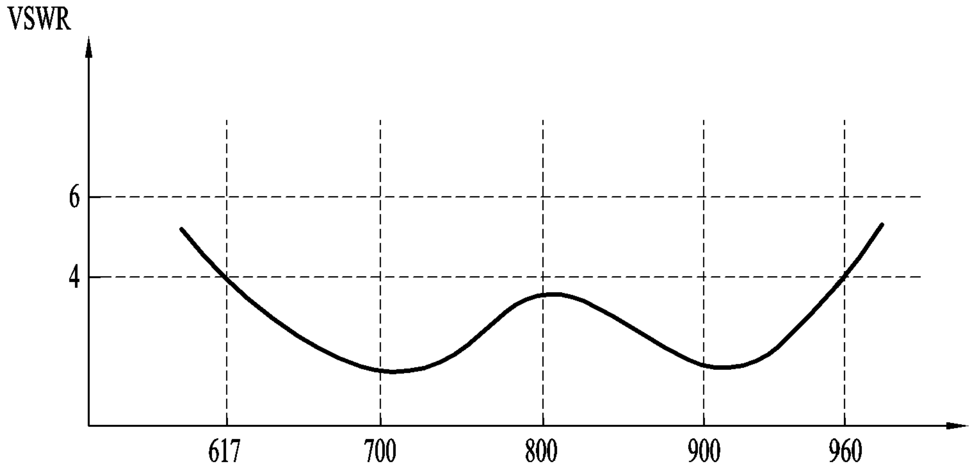

The dual-mode broadband antenna according to the present disclosure may operate in a monopole mode and a slot mode. In this regard, FIG. 9 is view showing a comparison result of VSWR characteristics between an antenna implemented in a single mode and an antenna implemented in a dual mode. (a) of FIG. 9 shows VSWR characteristics of an antenna implemented in a single mode. (b) of FIG. 9 shows VSWR characteristics of an antenna implemented in a dual mode.

Referring to (a) of FIG. 9, the VSWR characteristics are maintained only at a first frequency band, which is a low sub-band of the low band (LB). On the other hand, referring to (a) of FIG. 9, the VSWR characteristics are maintained in both the first frequency band, which is the low sub-band, and a second frequency band, which is a high band, in the low band (LB).

In this regard, an antenna technology for covering a wide frequency band of about 617 MHz to 6 GHz band is required to support 5G/SUB6 in a vehicle. Regarding the requirements for antennas operating in the low band (LB), mid band (MB), and high band (HB), the LB requirements are difficult to be achieved. In this regard, antenna performance in frequency bands from 1.4 GHz to 6 GHz corresponding to the mid band (MB) and the high band (HB) can be secured. However, it is not easy to secure antenna performance in the 617 to 960 MHz band below 1 GHz.

In particular, referring to (a) of FIG. 9, an antenna operating in one resonance mode has a bandwidth characteristic of about 230 MHz based on 4:1 of VSWR. Therefore, it is necessary to secure an additional bandwidth of about 120 MHz band in order to operate in a wide band as illustrated in (b) of FIG. 9. Referring to (b) of FIG. 9, a required bandwidth is 350 MHz or more to secure antenna performance in a frequency band of 617 to 960 MHz which is less than 1 GHz.

Figure 10:
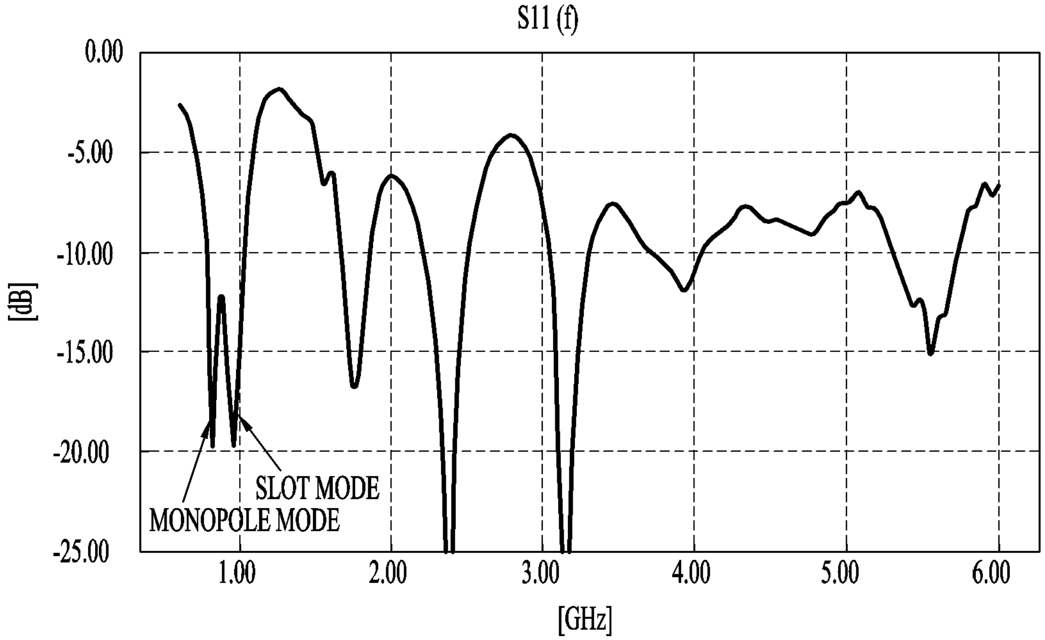
FIG. 10 is a view illustrating reflection coefficient characteristics and efficiency characteristics of a dual-mode broadband antenna according to the present disclosure.
Figure 10:
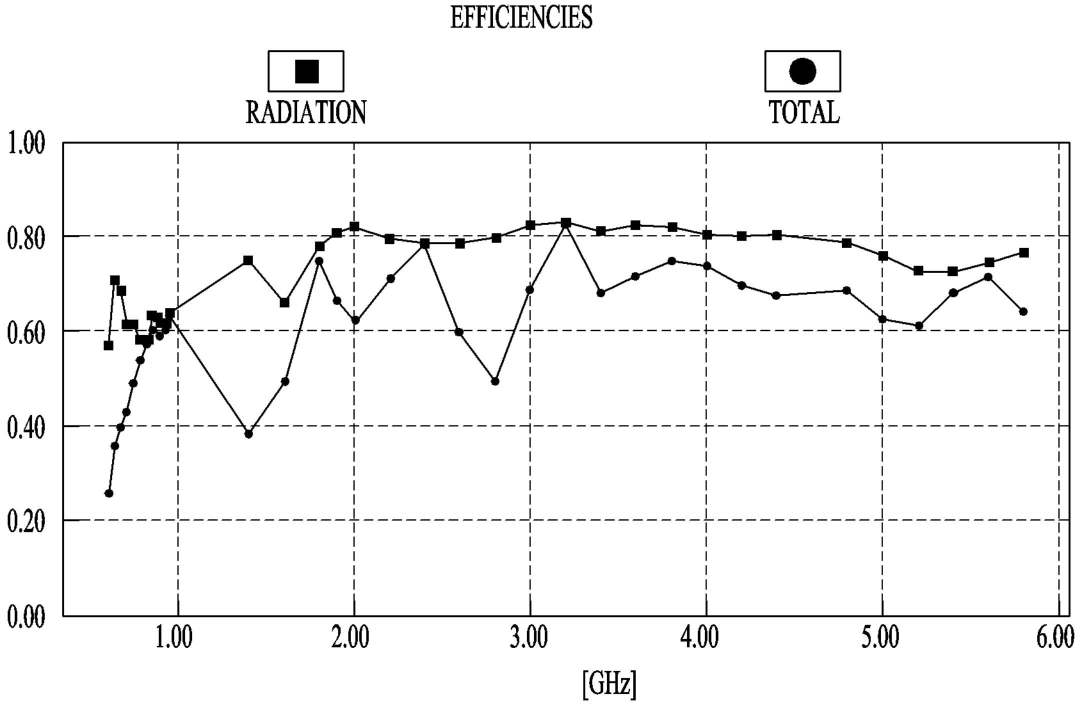

Therefore, it is necessary to increase an operating frequency band of an antenna in a low band (LB) without increasing an antenna disposition space by additionally generating a resonance mode of the antenna in a limited space. In this regard, FIG. 10 is a view illustrating reflection coefficient characteristics and efficiency characteristics of a dual-mode broadband antenna according to the present disclosure. (a) of FIG. 10 shows reflection coefficient characteristics of the dual-mode broadband antenna. (b) of FIG. 10 shows efficiency characteristics of the dual-mode broadband antenna.

Referring to (a) of FIG. 10, the antenna may operate in a first mode, which is a monopole mode, in a first frequency band of a low band (LB). Also, the antenna may operate in a second mode, which is a slot mode, in a second frequency band higher than the first frequency band of the low band. Meanwhile, a monopole radiator may operate as an antenna even in the mid band (MB) and the high band (HB) as well as the low band (LB) according to a structure with a circular metal plate and a bent rectangular plate. As illustrated in (a) FIG. 10, resonance characteristics are exhibited even in the mid band and the high band from 1.4 GHz to 6 GHz.

Referring to (b) FIG. 10, antenna efficiency is 60% or more in all frequency bands of the low band in addition to the mid band and the high band. Accordingly, the structural problem of the single-mode antenna structure, which is not easy to secure antenna performance in the frequency bands of 617 to 960 MHz band which is less than 1 GHz, can be solved with the dual-mode antenna structure.

The dual-mode broadband antenna structure according to the present disclosure may be interpreted as a combination structure of a monopole radiator and a slot radiator. Referring to (a) and (b) of FIG. 6, a broadband antenna is primarily designed as a radiator 1100R corresponding to an antenna pattern. Accordingly, as illustrated in (a) of FIG. 9, the antenna may operate in the first mode in the first frequency band of the low band (LB). In addition, the antenna may generate an additional resonance mode in a band less than 1 GHz using the slot region SR of the ground.

For the additional resonance mode, a feed pattern F may be formed on the PCB 1100, and current may be induced in the slot region SR of the ground. Accordingly, the slot region SR of the ground generates an additional resonance mode so that the entire antenna operates in the slot mode, that is, the second mode. Therefore, the dual resonance mode is generated by combining the resonance characteristics of the first resonance mode in the radiator 1100R and the second resonance mode in the slot region SR of the ground. In other words, the antenna operates in the first mode, which is the monopole mode, by the radiator 1100R in the first frequency band of the low band. Also, the antenna operates in the second mode as the slot mode in the second frequency band higher than the first frequency band, by the slot region SR formed on the metal plate of the lower cover 1310.

A radiator structure according to the present disclosure may include a feed pattern F, a first metal pattern 1111, and a second metal pattern 1112. The first metal pattern 1111 and the second metal pattern 1112 may be implemented on a dielectric carrier or in the form of a metal plate rather than being implemented on a PCB. Accordingly, the first metal pattern 1111 and the second metal pattern 1112 may be referred to as a first metal plate 1110 and a second metal plate 1120.

The feed pattern F may be formed on the PCB 1100 to convey a signal to the first metal pattern 1111. The feed pattern F is a signal line formed on the PCB 1100 with a predetermined width and a predetermined length. The first metal pattern 1111 may be operably coupled to the feed pattern F and may be formed substantially perpendicular to the PCB 1100. The second metal pattern 1112 may be bent from the first metal pattern 1110 to be disposed substantially parallel to the top cover 1320.

The first metal pattern 1111 may be implemented as a tapered metal plate. Since the first metal pattern 1111 is implemented as the tapered metal plate, a broadband operation can be performed even in the mid band (MB) and the high band (HB). In this regard, the feed pattern F1 may be formed as a metal pattern having a first width. The first metal pattern 1111 may be formed to have a second width within a predetermined range from the first width at a first part connected to the feed pattern F1. Also, the first metal pattern 1111 may be formed as a tapered metal plate having a third width wider than the second width at a second part connected to the second metal pattern 1112.

The radiator structure according to the present disclosure may be implemented with first and second metal patterns (plates) 1111 and 1112 having different shapes, that is, circular and rectangular metal patterns (plates). In this regard, the first metal pattern 1111 may be formed of a circular tapered metal plate. The second metal pattern 1112 may be formed of a metal plate having a predetermined length and a predetermined width. The width of the second metal plate 1112 may be wider than or equal to the third width of the first metal plate 1111.

The radiator structure according to the present disclosure may be implemented as a coupling feed structure instead of a direct feed structure for a broadband feed structure. Referring to (a) and (b) of FIG. 7, the first metal pattern 1111 may be coupled to an end portion of the feed pattern F through a dielectric gasket 1113. Accordingly, a signal from the feed pattern F may be conveyed to the first metal pattern 1111 in a coupling feed scheme. In an example, the dielectric gasket may be implemented as a silicon gasket. Accordingly, the end portions of the first metal pattern 1111 and the feed pattern F may be implemented as dielectric contacts, that is, silicon contacts, through the dielectric gasket 1113. Since the dielectric gasket 1113 couples the first metal pattern 1111 and the feed pattern F, it may be referred to as a dielectric coupling part 1113.

The slot region SR according to the present disclosure may be disposed adjacent to the feed pattern F to be perpendicular to each other so that signals can be coupled. In this regard, it may be interpreted that an electric source is induced in the feed pattern F and a magnetic source is induced in the slot region SR. Therefore, the feed pattern F and the slot region SR must be disposed substantially perpendicular to each other, so that signals can be efficiently conveyed. In this regard, the feed pattern F and the slot region SR may be disposed to overlap each other. However, in order to optimize antenna bandwidth characteristics and efficiency in the second frequency band of the low band (LB), the slot region SR may be disposed to be adjacent to the feed pattern F.

To optimize antenna bandwidth characteristics and efficiency in the second frequency band of the low band (LB), the slot region SR is disposed adjacent to the feed pattern F on one side of the feed pattern F. The slot region may be formed to have a first length L1 in a first axial direction, and the feed pattern F may be formed to have a second length L1 in a second axial direction perpendicular to the first axial direction. Accordingly, the magnetic source formed in the slot region SR is induced to an electric source formed in the feed pattern F. Accordingly, a signal can be radiated from the feed pattern F to be conveyed to the slot region SR.

The antenna substrate 1100 corresponding to the PCB 1100 according to the present disclosure may be operably coupled with the TCU substrate 1200. Specifically, the TCU substrate 1200 may be operably coupled with one side of the antenna substrate 1100 corresponding to the PCB 1100. Meanwhile, the at least one radiator 1100R may be configured to include a first radiator 1110 to a fourth radiator 1140 disposed in different regions of the antenna substrate corresponding to the PCB.

Figure 11:
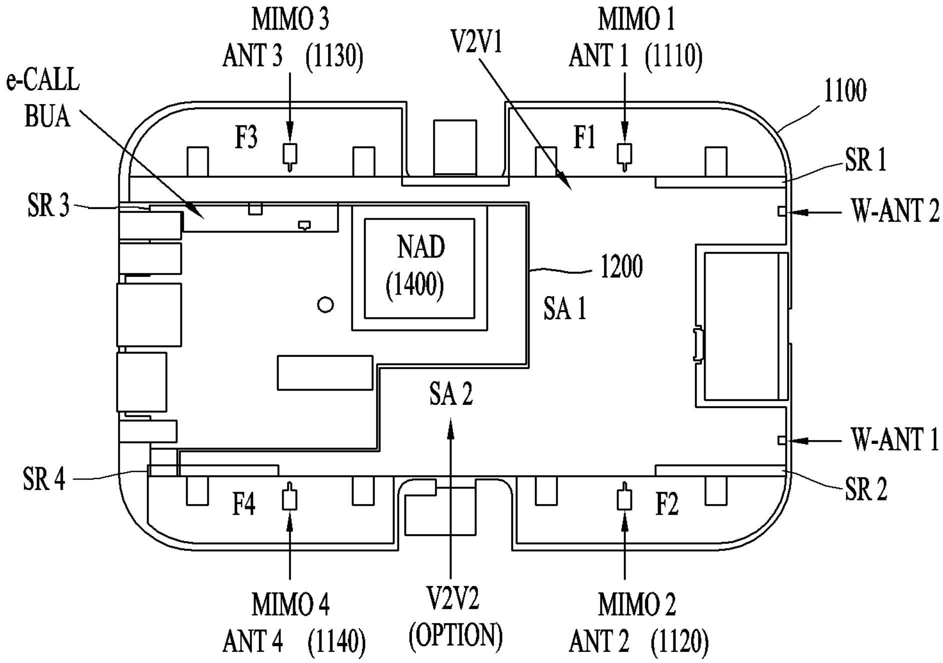
FIG. 11 is a view illustrating a configuration of a telematics unit and an antenna module coupled in a side region according to the present disclosure.

Hereinafter, a description will be given of the coupling structure between the antenna substrate 1100 corresponding to the antenna module and the TCU substrate 1200 corresponding to the telematics unit (module) and the antenna disposition structure in the antenna system according to the present disclosure. In this regard, FIG. 11 is a view illustrating a configuration of a telematics unit and an antenna module coupled in a side area according to the present disclosure.

Referring to FIGS. 5A to 8 and 11, the antenna element 1210 corresponding to the backup antenna BUA is disposed on the TCU substrate 1200. The antenna element 1210*a*, 1210*b* is an auxiliary antenna that performs an e-call (emergency call) function. Since a network access device (NAD) corresponding to the processor is disposed on the PCB 1200, the PCB 1200 may correspond to the telematics unit. The PCB 1200 corresponding to the telematics unit may be coupled to another PCB corresponding to the antenna module through a side area.

The antenna substrate 1100 may be operably coupled to the TCU substrate 1200 so as to surround an outer side of the TCU substrate 1200 corresponding to the telematics unit. The TCU substrate 1200 corresponding to the telematics unit may be operably coupled to the antenna module 1100 through at least one side area. For example, the NAD 1400 disposed on the TCU substrate 1200 may be operably coupled to the antenna module 1100 through a first side area SA1. To this end, the NAD 1400 may be electrically connected to the antenna substrate 1100 through an input/output interface formed on the first side area SA1. Also, other components disposed on the TCU substrate 1200 may be operably coupled to the antenna substrate 1100 through a second side area SA2. To this end, components disposed on the TCU substrate 1200 may be electrically connected to the antenna substrate 1100 through an input/output interface, for example, a connector, disposed on the second side area SA2.

In addition to the antenna element 1210*a*, 1210*b* corresponding to auxiliary antenna, a plurality of antennas 1110 to 1140 may be disposed on the antenna substrate 1100 corresponding to the antenna module. The plurality of antennas 1110 to 1140 may be disposed on different areas of the antenna substrate 1100 corresponding to areas outside an outer side of the TCU substrate 1200.

The other antennas 1110 to 1140 disposed on the antenna substrate 1100 may be disposed to perform MIMO in an LTE band or a 5G SUB6 band. To reduce interference between the first antenna (ANT1) 1110 to the fourth antenna (ANT4) 1140, the first antenna (ANT1) 1110 to the fourth antenna (ANT4) 1140 may be disposed on different areas of the antenna substrate 1100. For example, the antennas (ANT1 to ANT4) 1110 to 1140 may be disposed on an upper right side, a lower right side, an upper left side, and a lower left side, respectively, but may not be limited thereto.

Meanwhile, first and second WiFi antennas W-ANT1 and W-ANT2 configured to perform WiFi communication may be disposed adjacent to a side surface portion of the antenna substrate 1100. In addition, V2V antennas V2V1 and V2V2 configured to perform V2V communication (or V2X communication) may be disposed on different areas of the antenna substrate 1100.

Meanwhile, the processor 1400 disposed on the TCU substrate 1200 may perform MIMO using two or more of the first to fourth antennas corresponding to the first to fourth radiators 1110 to 1140. In this regard, the processor 1400 may be implemented in the form of a network access device (NAD) disposed on the TCU substrate 1200, but may not be limited thereto and may be implemented in any type of processor.

In the telematics module (antenna system) according to the present disclosure, a separate backup antenna (BUA) 1210 may be disposed in addition to the MIMO radiator 1100 described above. In this regard, the TCU substrate 1200 may be disposed on an empty area inside the PCB 1100. The backup antenna (BUA) 1210 may be disposed on one side surface of the TCU substrate 1200. Meanwhile, the slot region SR may be formed in an area of the lower metal 1310 corresponding to the area where the backup antenna (BUA) 1210 is disposed. Accordingly, the slot region SR may be combined with the radiator 1100R to operate as a dual-mode antenna or combined with the backup antenna (BUA) 1210 to operate as the dual-mode antenna.

Therefore, since the slot region SR is combined with the radiator 1100R to operate as the dual-mode antenna or combined with the backup antenna 1210 to operate as the dual-mode antenna, the slot region SR may also be referred to as a common slot region. To play a role of the common slot region, the common slot region may be located inside the bottom cover 1310 to cover the backup antenna (BUA) 1210, unlike other slot regions.

Corresponding that the radiator 1100R according to the present disclosure includes the plurality of radiators 1110 to 1140, the slot region SR may also be implemented with a plurality of slot regions SR1 to SR4. The slot region SR may include first to fourth slot regions SR1 to SR4 that are disposed respectively adjacent to first to fourth feed patterns F1 to F4 of the first to fourth radiators 1110 to 1140.

As described above, the first type slot region covering the backup antenna (BUA) 1210 may be formed more inward than the other slot regions. In this regard, FIG. 12 is a view illustrating the backup antenna (BUA) 1210 disposed in the slot region SR according to an embodiment.

Figure 12:
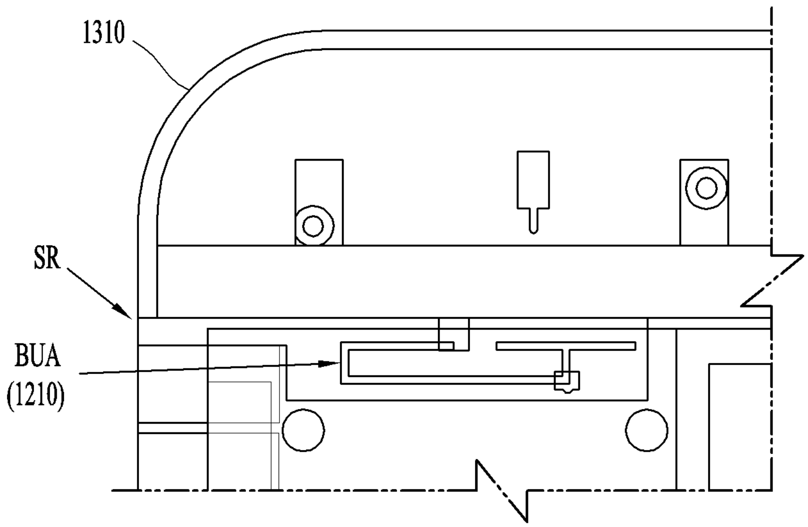
FIG. 12 is a view illustrating a backup antenna (BUA) 1210 disposed in a slot region (SR) according to an embodiment.
Figure 12:
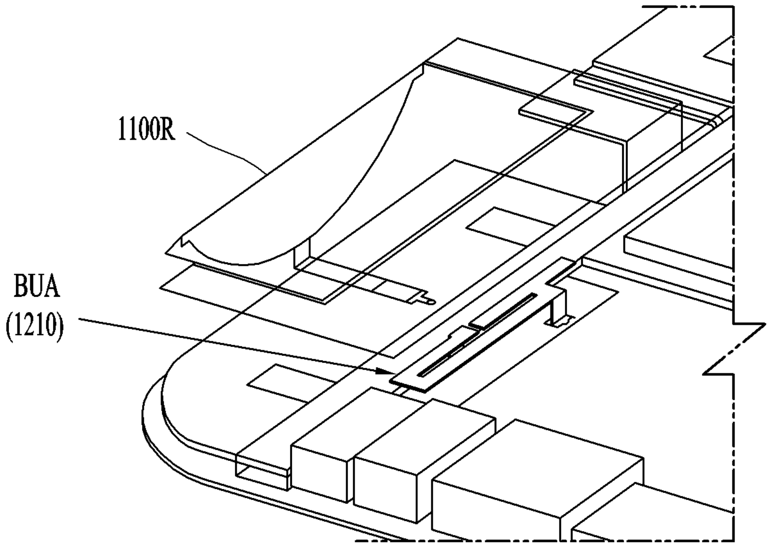

(a) of FIG. 12 is a front view of an antenna structure including the backup antenna (BUA) 1210 disposed in the slot region SR. On the other hand, (b) of FIG. 12 is a lateral view illustrating an antenna structure in which the backup antenna (BUA) 1210 disposed in the slot region SR is located adjacent to the radiator 1100R.

Figure 13:
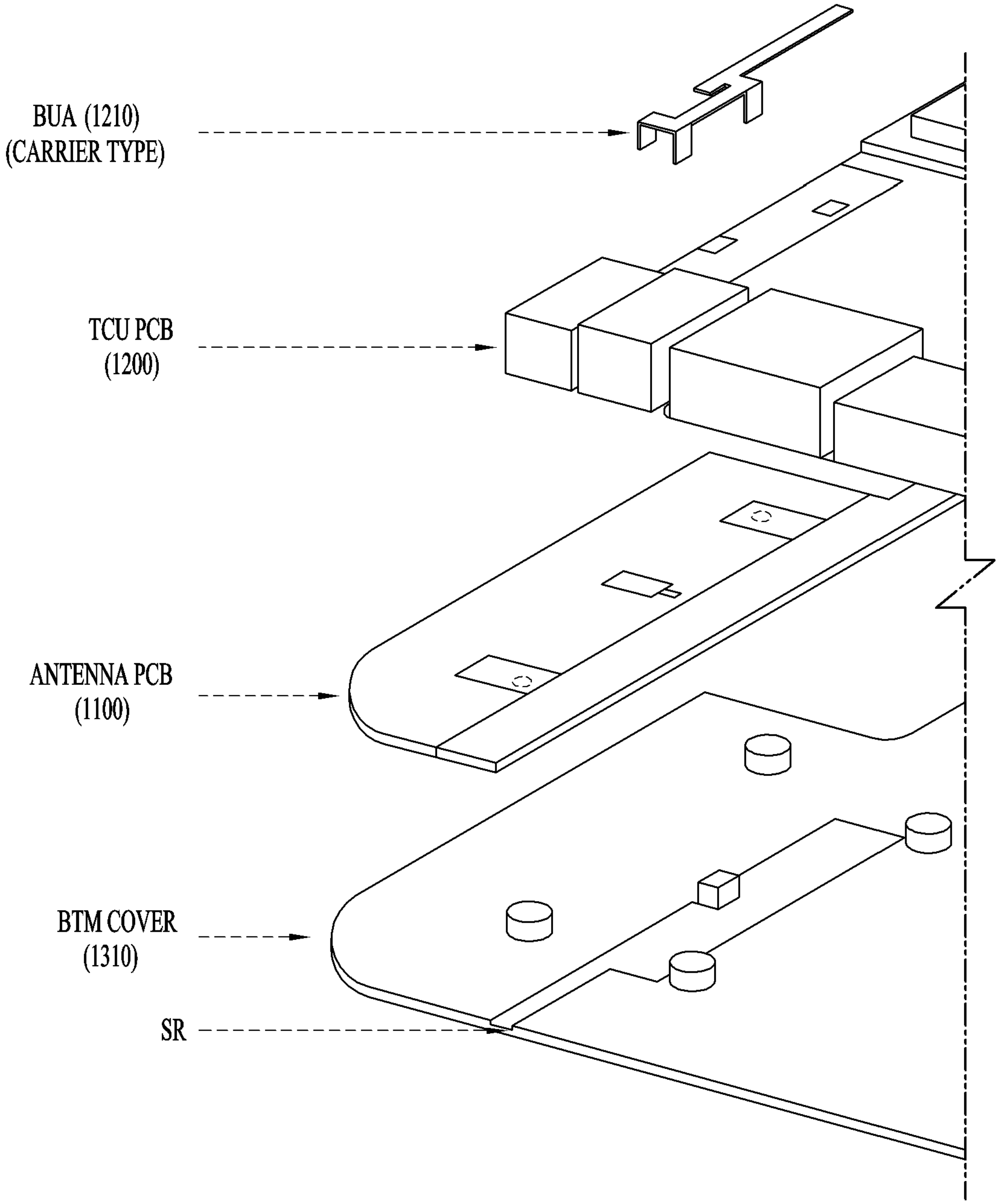
FIG. 13 is an exploded perspective view illustrating an antenna structure in which the backup antenna (BUA) 1210 and a radiator 1100R of (b) of FIG. 12 are disposed to be adjacent to each other.
Figure 14A:
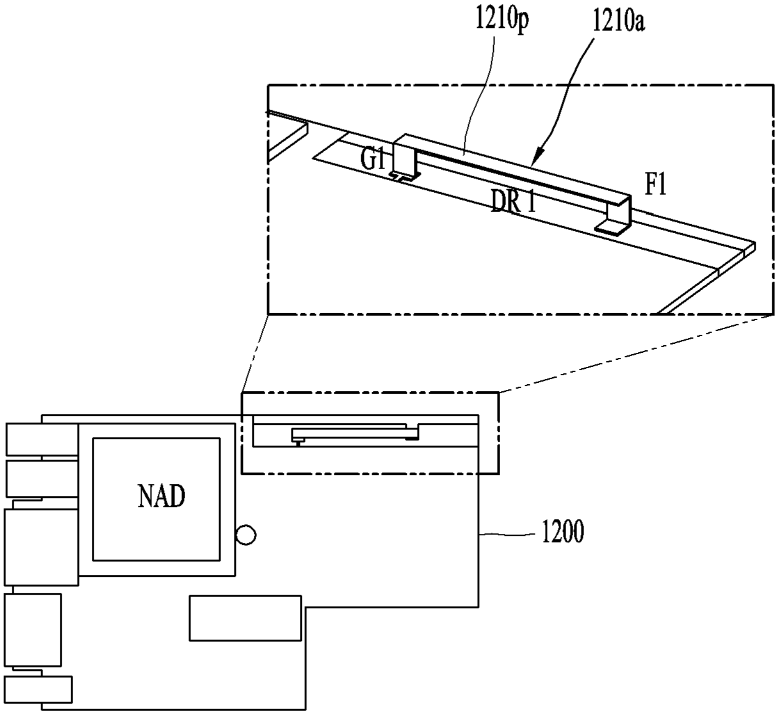
FIGS. 14A and 14B are views illustrating first and second type backup antenna structures according to a TCU substrate disposition structure according to other embodiments.
Figure 14A:
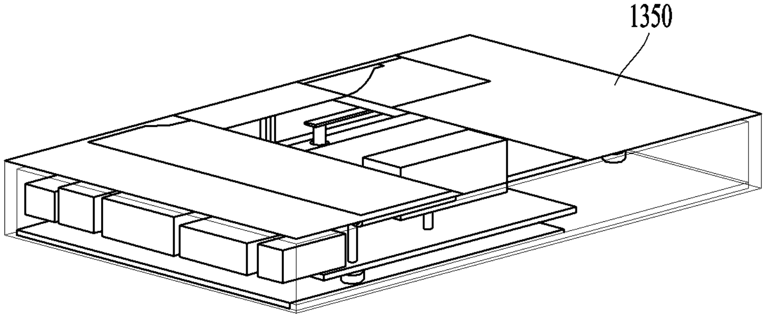
Figure 14B:
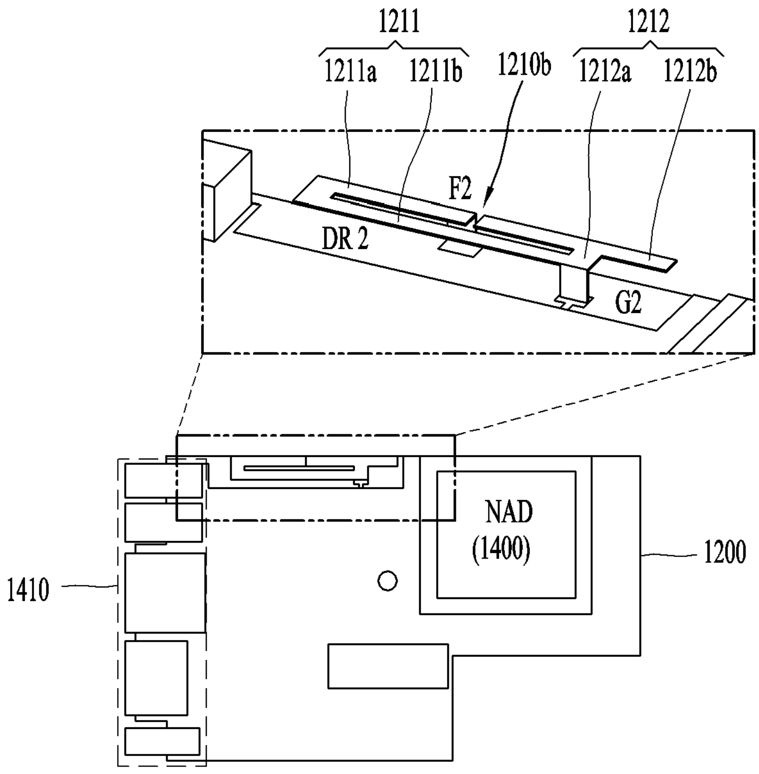
Figure 14B:
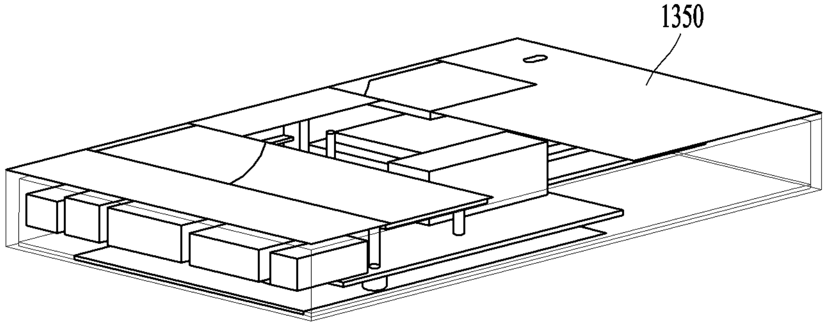

FIG. 13 is an exploded perspective view illustrating an antenna structure in which the backup antenna (BUA) 1210 and the radiator 1100R of (b) of FIG. 12 are disposed to be adjacent to each other. The backup antenna (BUA) 1210 may be implemented as the second antenna element 1210*b* of (b) and (c) of FIG. 5B, but may not be limited thereto. As another example, the backup antenna (BUA) 1210 may also be implemented as the first antenna element 1210*a* of (a) of FIG. 5B.

On the other hand, the first and second type antenna elements 1210*a* and 1210*b* of the backup antenna (BUA) 1210 according to the present disclosure may be selected by considering a component disposition structure within the TCU substrate 1200 or selected by considering antenna characteristics.

The first type antenna element 1210*a* may include a feed connection portion F1 vertically formed at one point of the conductive pattern and a ground connection portion G1 vertically formed at another point of the conductive pattern. Depending on applications, the positions of the feed connection portion F1 and the ground connection portion G1 may change. The second type antenna element 1210*b* may include a feed connection portion F2 vertically formed at one point of the conductive pattern and a ground connection portion G2 vertically formed at another point of the conductive pattern. Depending on applications, the positions of the feed connection portion F2 and the ground connection portion G2 may change. The ground connection portion G1, G2 may be configured to be connected to the ground of the PCB 1200. The feed connection portion F1, F2 may be configured to be connected to a signal line of the PCB 1200.

The first type antenna element 1210*a* may have a radiation portion implemented with a single conductive pattern 1210*p*. On the other hand, the second type antenna element 1210*b* may be implemented with a plurality of conductive patterns in which radiating portions are spaced apart at predetermined distances. Specifically, the second type antenna element 1200*b* may include a first conductive pattern 1211 and a second conductive pattern 1212.

The first conductive pattern 1211 may have one end portion connected to the ground connection portion G2 and another end portion connected to the feed connection portion F2. The first conductive pattern 1211 connected to the ground connection portion G2 and the feed connection portion F2 may be formed in a bending structure and disposed within a limited area of the PCB 1200. The first conductive pattern 1211 may include a first sub pattern 1211*a* and a second sub pattern 1211*b* disposed in parallel. The first sub pattern 1211*a* may have a first length, and the second sub pattern 1211*b* may have a second length longer than the first length.

The second conductive pattern 1212 may include a connection part 1212*a* formed on one end portion thereof and connected to the ground connection portion G2, and an extension part 1212*b* extending from another end portion thereof to both sides. One end portion of the connection part 1212*a* of the second conductive pattern 1212 may be connected to the ground connection portion G2 and another end portion may be connected to the extension part 1212*b*. The extension part 1212*b* of the second conductive pattern 1212 may be disposed adjacent to the second sub pattern 1211*b* of the first conductive pattern 1211 at a predetermined distance. Accordingly, the second type antenna element 1210*b* may be disposed within a limited area of the PCB 1200, compared to the first type antenna element 1210*a*.

The feed connection portion F1, F2 may be configured to apply signals to the slot region SR1, SR2 so that the bottom cover 1310 operates as a slot antenna. The feed connection portion F1, F2 may be connected to a feeding path of the PCB 1200, and the feeding path of the PCB 1200 may be disposed in the slot region SR1, SR2. According to the configuration of the feed connection portion F1, F2 disposed in the slot region SR1, SR2, the bottom cover 1310 may be configured to operate as a slot antenna.

Referring to FIGS. 11 to 14B, the backup antenna (BUA) 1210 disposed in an area corresponding to the slot region SR may be disposed on the TCU substrate 1200 inside the antenna substrate 1100. On the other hand, the radiator 1100R in which the feed pattern is disposed adjacent to the slot region SR may be disposed on the antenna substrate 1100.

The slot region SR may include first to fourth slot regions SR1 to SR4 that are disposed respectively adjacent to first to fourth feed patterns F1 to F4 of the first to fourth radiators 1110 to 1140.

Among the first slot region SR1 to the fourth slot region SR4, a first type slot region formed in an area corresponding to the area where the backup antenna (BUA) 1210 is disposed may be located in an area toward the TCU substrate 1200. A second type slot region other than the first type slot region may be located in an area toward the antenna substrate 1100. Accordingly, the first type slot region may be formed in the bottom cover 1300 more inward than the second type slot region. The first type slot region may have a width W wider than that of the second type slot region so as to cover the backup antenna (BUA) 1210.

Figure 15:
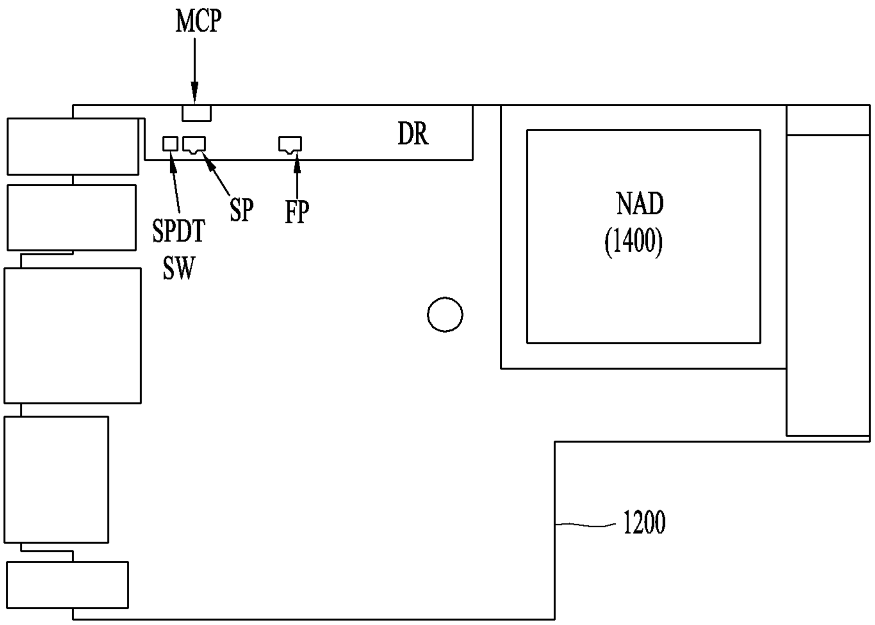
FIG. 15 is a front view of a TCU substrate to which a backup antenna may be attached.

Meanwhile, in relation to the structure of the backup antenna (BUA) 1210+the antenna 1110 according to the present disclosure, the slot region SR may be dynamically implemented in an optimal shape according to each antenna operation. In this regard, FIG. 15 is a front view of a TCU substrate to which a backup antenna may be attached. Referring to FIG. 15, one region of the TCU substrate 1200 to which the backup antenna can be attached may be formed as a dielectric region (DR) from which a metal pattern is removed.

A feed pad (FP) to feed the backup antenna, a metal coupling pad (MCP) for contact coupling with an upper metal, and a switch pad (SP) for connection with a switch may be disposed on the dielectric region (DR). The TCU substrate 1200 may be configured such that a first type component 1400 and a second type component 1410 are disposed on one side and another side thereof, respectively. The second antenna element 1210*b* in FIG. 14B may be disposed between the first type component 1400 and the second type component 1410. A configuration in which the network access device (NAD) 1400 and the backup antenna (BUA) 1210 are disposed on the one side and another side of the TCU substrate 1200 corresponding to the telematics unit is shown.

The disposition of the backup antenna (BUA) 1210 may not be limited to the disposition on the TCU substrate 1200 of FIG. 15, but may vary depending on applications. As another example, the antenna element 1210*a* of FIG. 14A may be disposed on one side of the PCB 1200, which is different from an area where the first type component 1400 and the second type component 1410 are disposed. On the other hand, the first type component 1400 and the second type component 1410 may be disposed on another side of the PCB 1200.

Figure 16:
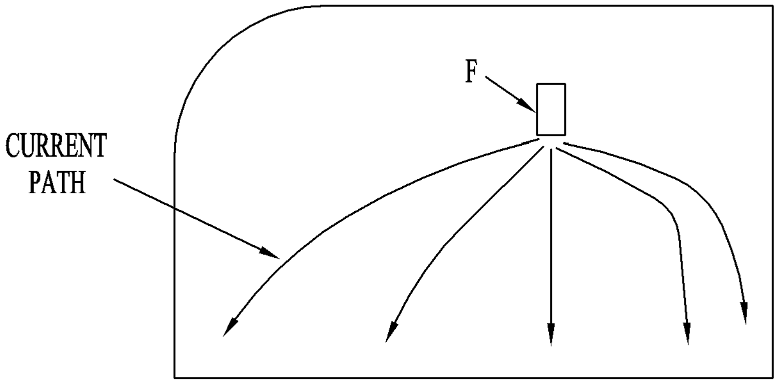
FIG. 16 is a view comparing a current formation path at a feed pattern according to whether or not a slot region is formed in a bottom cover.
Figure 16:
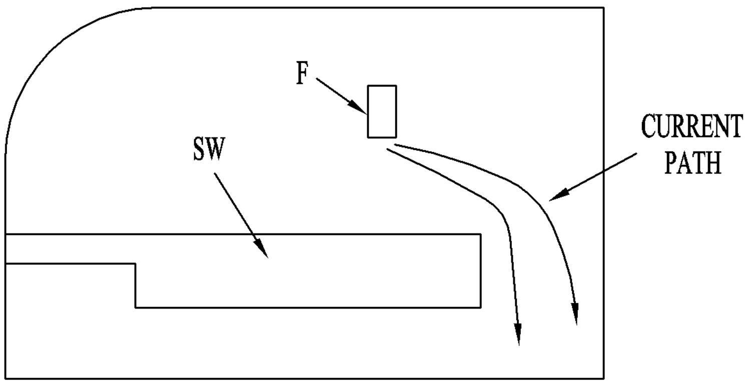

Meanwhile, FIG. 16 is a view comparing a current formation path at a feed pattern according to whether or not a slot region is formed in a bottom cover. In this regard, FIG. 17 is a view comparing radiation efficiency and total efficiency between a radiator and a backup antenna when a slot region is formed in a bottom cover.

Referring to (a) of FIG. 16, when the slot region is not formed in the bottom cover 1310, a current formation path by the feed pattern F is formed on both sides with respective to the feed pattern F. On the other hand, referring to (b) of FIG. 16, when the slot region is formed in the bottom cover 1310, the current formation path by the feed pattern F is formed on one side with respect to the feed pattern F.

When the slot region is not formed as shown in (a) of FIG. 16, efficiency is about 58% (about −2.37 dB). On the other hand, when the slot region is formed as shown in (b) of FIG. 16, the efficiency is about 35% (about −4.56 dB), and antenna efficiency decreases.

Figure 17:
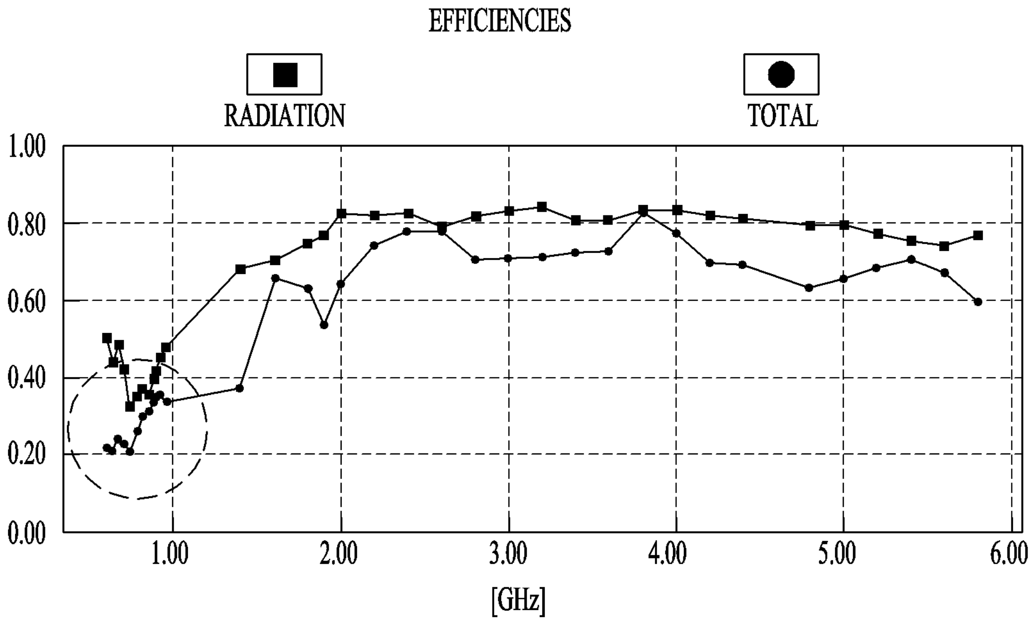
FIG. 17 is a view comparing radiation efficiency and total efficiency between a radiator and a backup antenna when a slot region is formed in a bottom cover.
Figure 17:
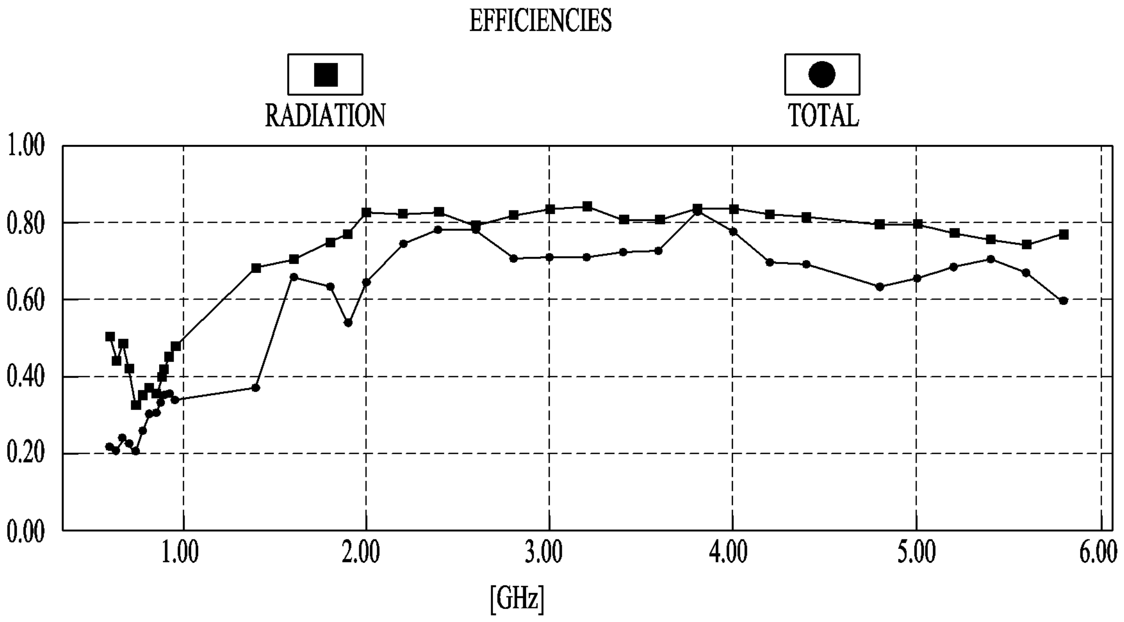

(a) of FIG. 17 shows radiation efficiency and total efficiency of a radiator, which decreases in efficiency when the slot region is formed in the bottom cover. (b) of FIG. 17 shows radiation efficiency and total efficiency of a backup antenna when the slot region is formed in the bottom cover.

Referring to (b) of FIG. 16 and (a) of FIG. 17, when the slot region is formed in the bottom cover 1310, the efficiency of the MIMO radiator may decrease in the low band (LB). In other words, when the backup antenna (BUA) 1210 is additionally disposed, the ground shape is changed and the efficiency of the MIMO radiator may decrease.

On the other hand, referring to (b) of FIG. 16 and (b) of FIG. 17, even when the slot region SR is formed in the bottom cover 1310, the efficiency of the backup antenna does not decrease. This results from that the location of the slot region SR is optimized so that the slot region SR is formed in an area corresponding to the backup antenna.

In this regard, as the slot region SR is disposed inside the bottom cover 1310, efficiency deterioration occurs when the MIMO radiator operates. If the slot region SR is disposed adjacent to the feed pattern F in order to prevent the efficiency deterioration, efficiency deterioration may occur in the backup antenna.

To configure a slot structure which is optimal for both the MIMO radiator and the backup antenna, the slot region SR needs to be dynamically changed depending on an operating mode. Therefore, an antenna selection method using a switch according to an embodiment may be applied. In this regard, the present disclosure applies an antenna technology that actively utilizes not only an antenna pattern but also a ground body as antenna radiators.

In this regard, since the antenna pattern is designed in the limited space inside the TCU, it may be difficult to secure antenna performance due to the limitation of the antenna disposition space. On the other hand, due to the expansion of the communication system mounted on the vehicle, the number of components mounted on the PCB within the TCU increases. As a result, the antenna disposition space is reduced. To overcome this problem, a ground having a relatively wide area is used as an antenna. Therefore, a broadband antenna and antenna miniaturization can be achieved by forming the slot region in the ground.

However, in addition to the MIMO radiator, when the backup antenna is disposed adjacent to the MIMO radiator, the slot region of the ground is optimal for a specific radiator, but may cause performance degradation for other radiators.

Figure 18:
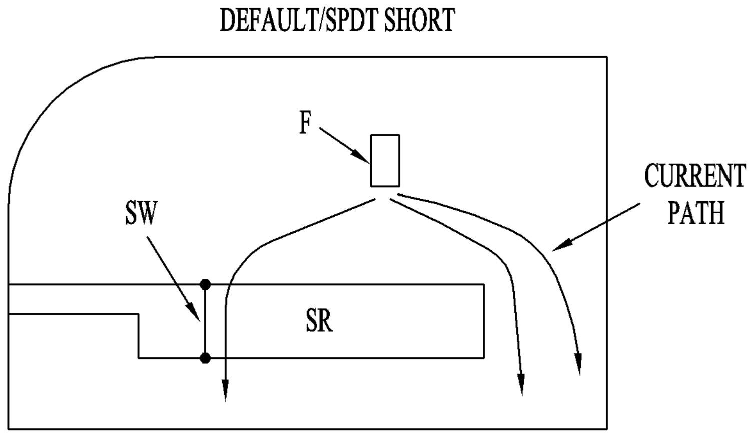
FIG. 18 is a view illustrating a current path and a switch configuration in a feed pattern and a switch configuration operated by selecting one of MIMO antennas and a backup antenna in a normal state.
Figure 18:
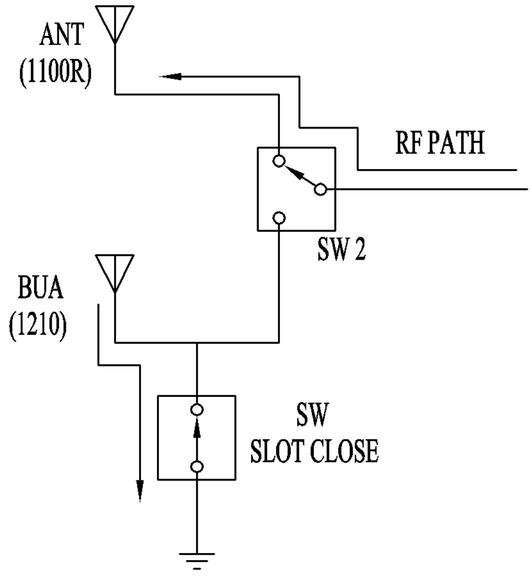

In this regard, FIG. 18 is a view illustrating a current path and a switch configuration in a feed pattern and a switch configuration operated by selecting one of MIMO antennas and a backup antenna in a normal state.

(a) of FIG. 18 shows a current path and a switch configuration in a feed pattern in a normal state. (b) of FIG. 18 shows a configuration diagram of a switch operated by selecting one of MIMO antennas and a backup antenna in a normal state.

Figure 19:
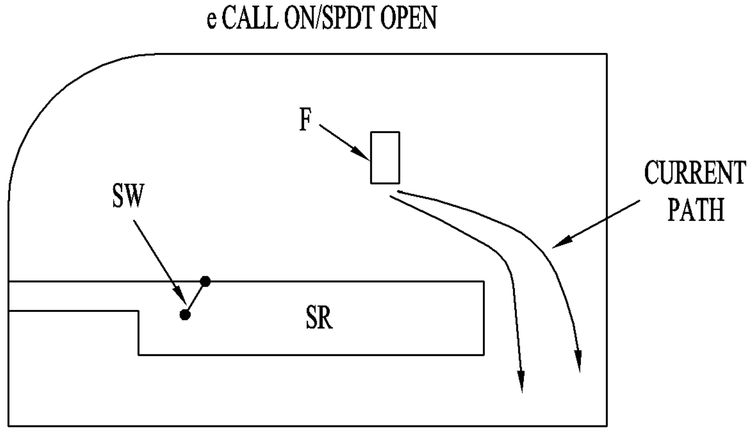
FIG. 19 is a view illustrating a current path and a switch configuration in a feed pattern and a switch configuration operating by selecting one of MIMO antennas and a backup antenna in an emergency state.
Figure 19:
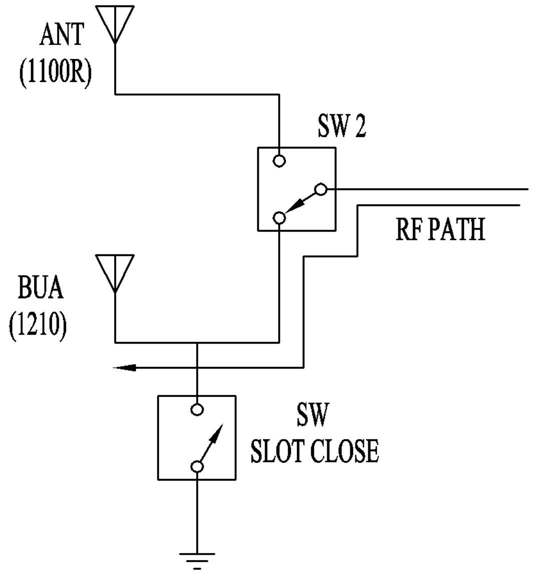

FIG. 19 is a view illustrating a current path and a switch configuration in a feed pattern and a switch configuration operated by selecting one of MIMO antennas and a backup antenna in an emergency state.

(a) of FIG. 19 shows a current path and a switch configuration in a feed pattern in an emergency state. (b) of FIG. 19 shows a configuration diagram of a switch operated by selecting one of MIMO antennas and a backup antenna in an emergency state.

Referring to FIGS. 18 and 19, at least one switch SW, SW2 may be disposed on the TCU substrate 1200 constituting the antenna system.

Referring to FIGS. 5A to 19, the antenna system may further include a switch SW that is disposed in the first type slot region SR formed adjacent to the area where the backup antenna (BUA) 1210 is disposed, and electrically shorts the slot region SR. In this regard, an operating state of the switch SW may change depending on whether the backup antenna (BUA) 1210 is operating.

In addition, the antenna system may further include a second switch SW2 that is configured to transfer a signal to one of the backup antenna (BUA) 1210 and the radiator 1100R adjacent to the backup antenna 1210. The processor 1400 may be configured to control the operation of the switch SW and the second switch SW2.

The processor 1400 controls the operations of the switch SW and the second switch SW2 in a first mode in which the backup antenna 1210 does not operate but the radiator 1100R disposed on the antenna substrate 1100 to be adjacent to the backup antenna operates. In other words, in the first mode, the processor 1400 may control the switch SW to be shorted and the second switch SW2 to be connected to a first path. The first path is a path through which the wireless communication unit is connected to the radiator (ANT) 1100R of (b) of FIG. 18. In the first mode, the processor 1400 may control the wireless communication unit so that the switch SW is shorted and the second switch SW2 is connected to the first path.

Accordingly, the slot region SR can be equalized to an electrically shorted state. This can suppress efficiency deterioration of the radiator as in the structure of (a) of FIG. 16 in which the slot region is not disposed.

In this regard, when the slot region SR is electrically shorted, it is necessary to examine whether a bandwidth is reduced due to a second mode operation, i.e., the slot mode, not performed. In this regard, FIG. 20 is a view illustrating efficiency characteristics of a radiator and a backup antenna according to switch ON/OFF.

Figure 20:
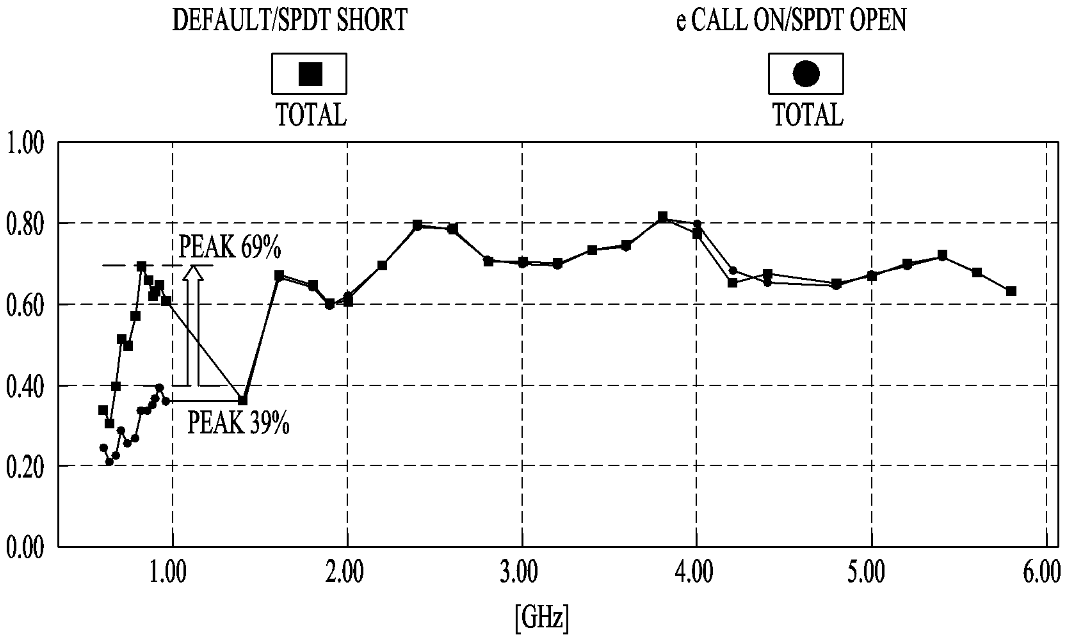
FIG. 20 is a view illustrating efficiency characteristics of a radiator and a backup antenna according to switch ON/OFF.

Referring to FIG. 20, when the switch is in an ON state, that is, in a shorted state, i) the efficiency of the radiator increases up to 69%. In particular, it has high antenna efficiency even in the second frequency band, which is a high frequency band in the low band (LB). Accordingly, it can be confirmed that the second mode operation is normally performed even when the slot region SR is electrically shorted.

When the switch is in an OFF state, that is, in an open state, ii) the efficiency of the radiator is about 30%, which means that no performance degradation occurs compared to the efficiency of (b) of FIG. 17. On the other hand, comparing the antenna efficiency in the mid band (MB) and high band (HB) with the efficiency of (b) of FIG. 17, stable performance for each band may be maintained.

Meanwhile, the processor 1400 may control the switch SW to be open and the second switch SW2 to be connected to a second path in the second mode in which the radiator 1100R does not operate and the backup antenna 1210 operates. The second path is a path through which the wireless communication unit is connected to the backup antenna 1210 of (b) of FIG. 19. In the second mode, the processor 1400 may control the wireless communication unit so that the switch SW is open and the second switch SW2 is connected to the second path.

Accordingly, the slot region SR can be equalized to an electrically open state. Accordingly, the slot region can be disposed adjacent to the backup antenna 1210 so that the backup antenna BUA 1210 can operate as a ground boosting antenna.

Figure 21A:
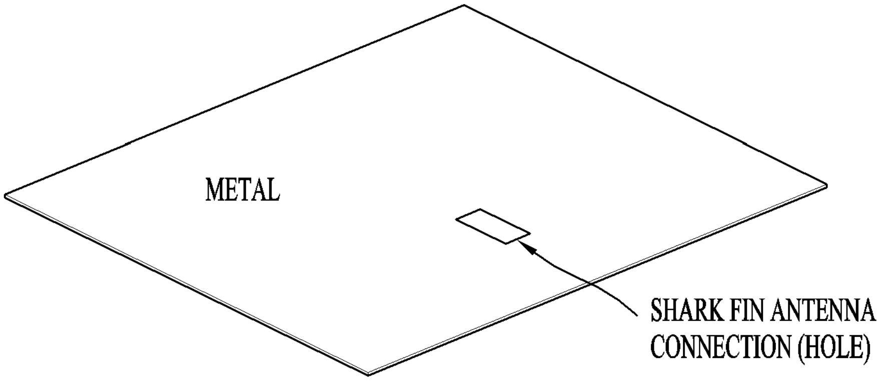
FIG. 21A is a view illustrating a metal structure having a hole (slot), to which a separate antenna structure can be coupled, is formed and a telematics unit disposed beneath the metal structure.
Figure 21A:
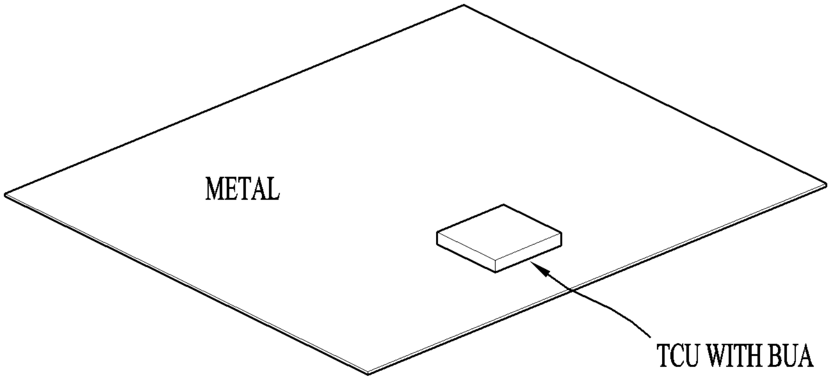
Figure 21B:
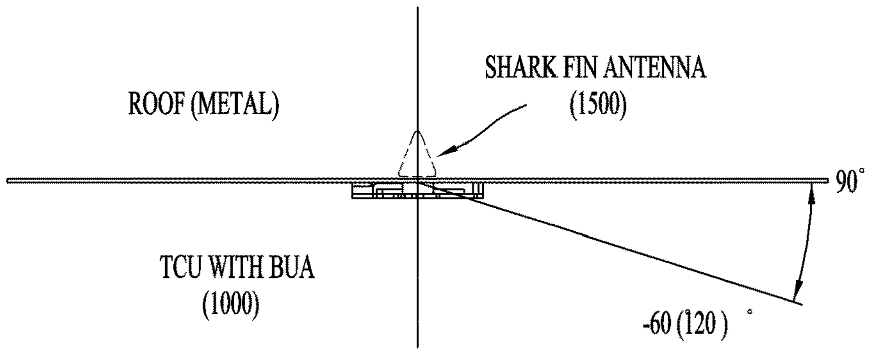
FIG. 21B is a view illustrating a shape in which a telematics unit is disposed on a bottom of a roof of a vehicle and a separate antenna structure is installed on a top of the roof.

The antenna structure according to the present disclosure may be disposed on the bottom of the metal structure corresponding to the roof of the vehicle. In addition, a hole structure (slot structure) that can be combined with other antenna structures may be disposed on the top of the metal structure. In this regard, FIG. 21A is a view illustrating a metal structure having a hole (slot), to which a separate antenna structure can be coupled, is formed and a telematics unit disposed beneath the metal structure. FIG. 21B is a view illustrating a structure in which a telematics unit is disposed on a bottom of a roof of a vehicle and a separate antenna structure is installed on a top of the roof.

(a) of FIG. 21A shows a structure having a hole (slot), to which an antenna structure, for example, a shark-fin antenna can be coupled, formed in the roof of the vehicle corresponding to the metal structure. Referring to (b) of FIG. 21A, the telematics unit, that is, the antenna system 1000 may be disposed on the bottom of the roof of the vehicle corresponding to the metal structure.

Referring to (b) of FIG. 21A and FIG. 21B, a TCU body having an e-call backup antenna embedded therein may be attached to the bottom of a metal or carbon roof of a vehicle. Meanwhile, measurement criteria of the antenna radiation pattern by the backup antenna (BUA) may be evaluated by an antenna gain at 60 to 90 degrees with respect to the bottom of the roof.

The antenna system 1000 may be disposed on the bottom of the roof of the vehicle. The telematics unit 1000 formed by the bottom cover 1310 and the top cover 1320 may be disposed on the bottom of the roof of the vehicle. A radiator may be configured with the antenna element 1210*a*, 1210*b* and the metal plate 1311 on which the slot region SR is formed. Accordingly, the radiator of the ground boosting structure can radiate signals in a horizontal direction and a downward direction with respect to the roof of the vehicle. Referring to FIGS. 5A to 21B, the telematics unit formed by the bottom cover 1310 and the top cover 1320 may be disposed on the bottom of the roof of the vehicle. The antenna configured with the at least one radiator 1100R and the metal plate of the bottom cover 1310 having the slot region SR may radiate signals in the horizontal direction and the downward direction with respect to the roof of the vehicle.

Meanwhile, the antenna system may further include an antenna structure 1500 configured such that at least a portion thereof is exposed to the top of the roof of the vehicle. The antenna structure 1500 may be configured to be coupled with the top cover, and a signal received through an antenna in the antenna structure 1500 may be conveyed to the telematics unit 1000 on the bottom of the roof. The signal received through the antenna in the antenna structure 1500 may be transferred to the antenna substrate 1100 or the PCB 1200 in the telematics unit 1000. The signal received through the antenna in the antenna structure 1500 may be transferred to the NAD 1400 disposed on the PCB 1200.

Figure 21C:
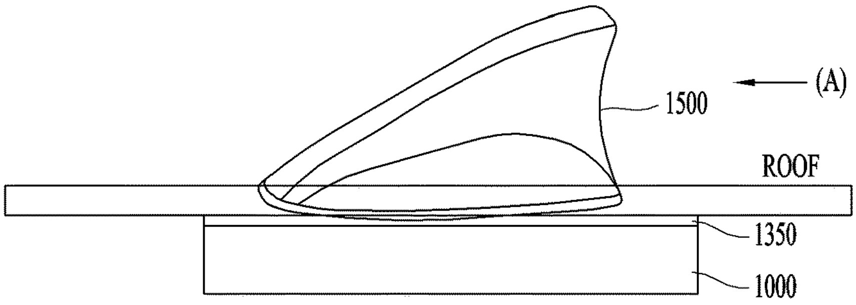
FIG. 21C is a view illustrating a configuration in which a plurality of antenna structures according to the present disclosure are disposed on top and bottom of a roof of a vehicle.
Figure 21C:
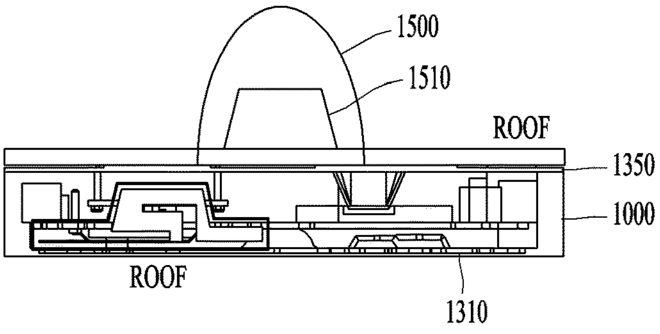

As described above, apart from the antenna system 1000 disposed on the bottom of the roof of the vehicle according to the present disclosure, the antenna structure 1500 may be disposed such that at least a portion thereof protrudes to the top of the roof of the vehicle. In this regard, FIG. 21C is a view illustrating a configuration in which a plurality of antenna structures according to the present disclosure are disposed on top and bottom of a roof of a vehicle. (a) of FIG. 21C is a first side view illustrating the antenna system 1000 disposed on the bottom of the roof of the vehicle and the antenna structure 1500 disposed on the top of the roof of the vehicle. (b) of FIG. 21C is a second side view (rear side view) illustrating the antenna system 1000 disposed on the bottom of the roof of the vehicle and the antenna structure 1500 disposed on the top of the roof of the vehicle. That is, (b) of FIG. 21C is the second side view (rear side view) illustrating the antenna system 1000 and the antenna structure 1500 in a direction A of (a) of FIG. 21C.

Referring to (a) and (b) of FIG. 21C, a metal sheet 1350 may be disposed between the roof of the vehicle and the top cover of the antenna system 1000 to improve antenna efficiency. Referring to (b) of FIG. 21C, the backup antenna (BUA) may be disposed. The backup antenna (BUA) may be configured to perform an emergency call (e-call) and may include the first type or second type antenna element 1210*a*, 1210*b*.

Referring to (b) of FIG. 21C, an antenna support part 1510 may be disposed within the antenna structure 1500. The antenna support part 1510 may be formed in a polyhedral shape, and an antenna substrate may be disposed on each side. A plurality of array antennas may be disposed on the antenna substrate disposed on each side to perform beamforming in the mmWave band. In addition, the MIMO operation may be performed by simultaneous beamforming of the plurality of array antennas.

On the other hand, other antennas operating in other bands, such as the LTE band and the 5G SUB6 band, may be disposed on the antenna support part 1510. As another example, the other antennas operating in the other bands may be disposed on at least one of a front area, a rear area, and a side area adjacent to the antenna support part 1510.

It will be clearly understood by those skilled in the art that various changes and modifications to the aforementioned implementations related to the antenna system are made without departing from the idea and scope of the present disclosure. Therefore, it should be understood that such various modifications and alternations for the implementations fall within the scope of the appended claims.

Figure 22:
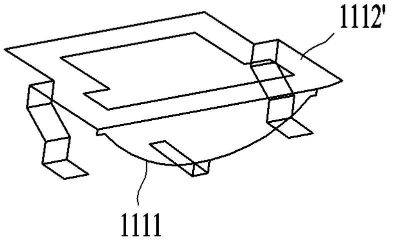
FIG. 22 is a view illustrating configurations of radiators according to various embodiments of the present disclosure.
Figure 22:
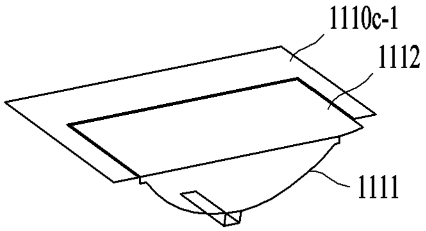
Figure 22:
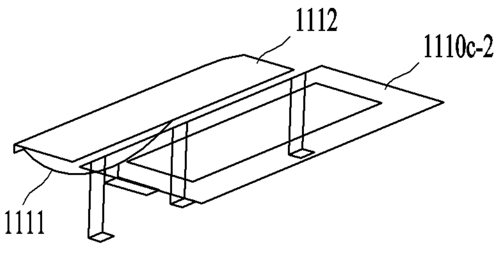
Figure 22:
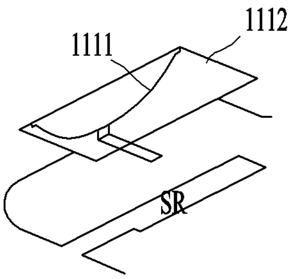

In this regard, FIG. 22 is a view illustrating configurations of radiators according to various embodiments of the present disclosure. Referring to FIG. 22, radiators 1100R-1 to

1100R-4 of first to fourth type (TYPE1 to TYPE4) may be disposed. The radiator 1100R-1 of the first type TYPE1 may be referred to as a short-loop antenna. The radiator 1100R-2 of the second type TYPE2 may be referred to as a coupling monopole antenna. The radiator 1100R-3 of the third type TYPE3 may be referred to as a monopole+loop antenna for improving LB performance. The radiator 1100R-4 of the fourth type TYPE4 may be referred to as a monopole+slot antenna.

A broadband antenna according to the present disclosure is required to satisfy bandwidth requirements of about 300 MHz, preferably, about 350 MHz. Accordingly, one of the radiators 1100R-1 to 1100R-4 of the first to fourth type TYPE1 to TYPE4 can be used. Depending on applications, one of the radiators 1100R-2 to 1100R-4 of the second to fourth types TYPE2 to TYPE4 may be used.

A first metal pattern 1111 may be commonly implemented in the radiators 1100R-1 to 1100R-4 of the first type TYPE1 to the fourth type TYPE4. In other words, each of the radiators 1100R-1 to 1100R-4 includes the first metal pattern 1111 formed of a circular metal plate. In addition, the radiators 1100R-2 to 1100R-4 each may further include a second metal pattern 1112 bent from the first metal pattern 1111 at a predetermined angle and extending by a predetermined width and a predetermined length.

The radiator 1100R-1 of the first type TYPE1 may be implemented in a loop shape such that the second metal pattern 1112' is connected to the first metal pattern 1111 and an empty area is formed therein. The radiator 1100R-4 of the fourth type TYPE4 does not have a separate coupling pattern, and may operate even at the second frequency band as the higher band in the low band (LB) through the slot region SR formed in the lower cover 1310.

On the other hand, the radiator 1100R-2 of the second type TYPE2 may include a coupling pattern 1110*c*-1 spaced apart from the second metal pattern 1112 by a predetermined distance. The coupling pattern 1110*c*-1 may be configured as a semi-closed loop to surround the second metal pattern 1112.

On the other hand, the radiator 1100R-3 of the third type TYPE3 may include a coupling pattern 1110*c*-2 spaced apart from the second metal pattern 1112 by a predetermined distance. The coupling pattern 1110*c*-2 may be configured as a loop that is spaced apart from one side of the second metal pattern 1112 by a predetermined distance and has an empty area formed therein.

All the radiators 1100R-1 to 1100R-4 of the first type TYPE1 to the fourth type TYPE4 may have efficiency of 50% or more in the LB. The radiator 1100R-4 of the fourth type TYPE4 may be implemented to have the highest efficiency of 68% in the LB.

Figure 23A:
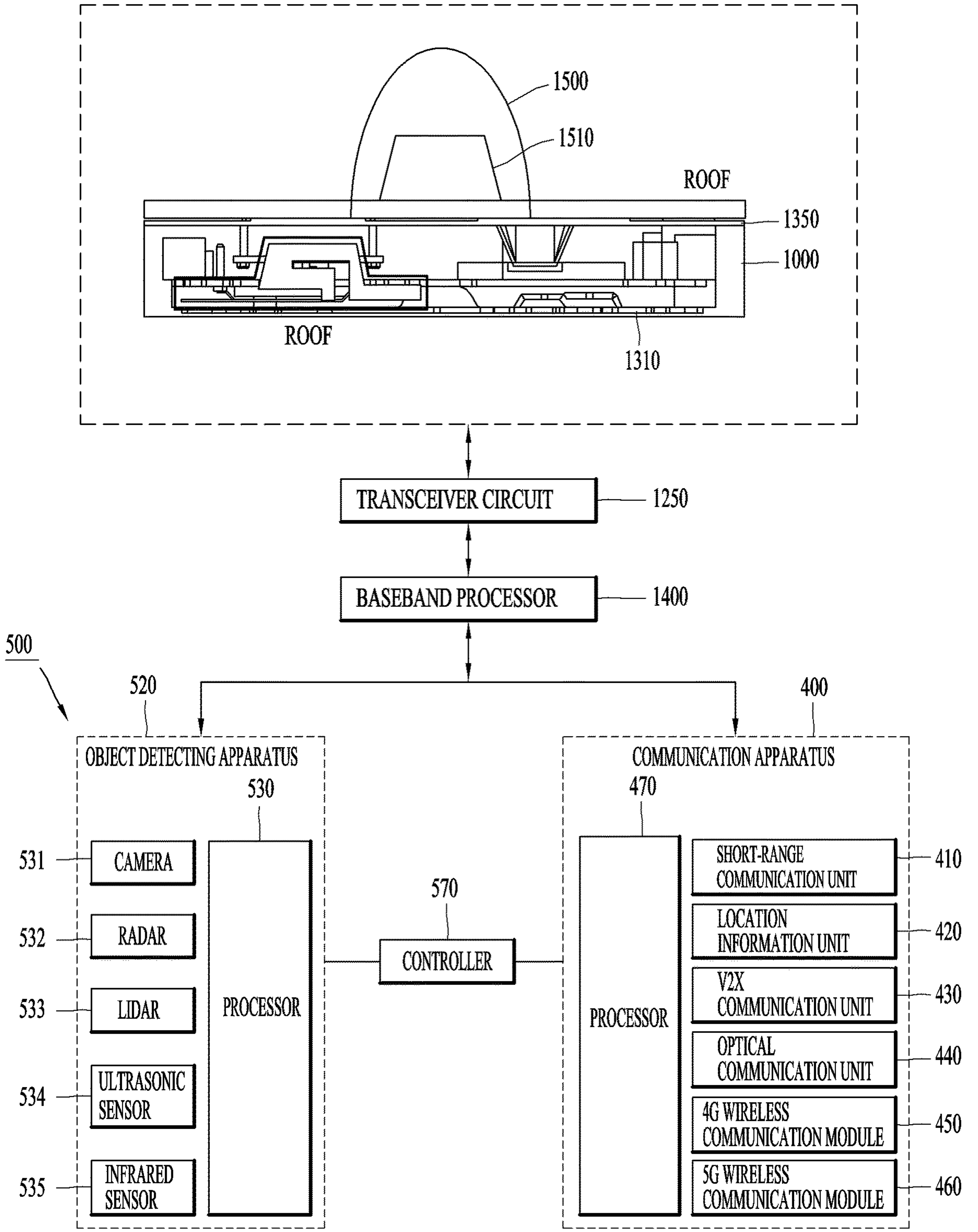
FIGS. 23A and 23B are views illustrating configurations of an antenna system according to an embodiment and a vehicle on which the antenna system is mounted.
Figure 23B:
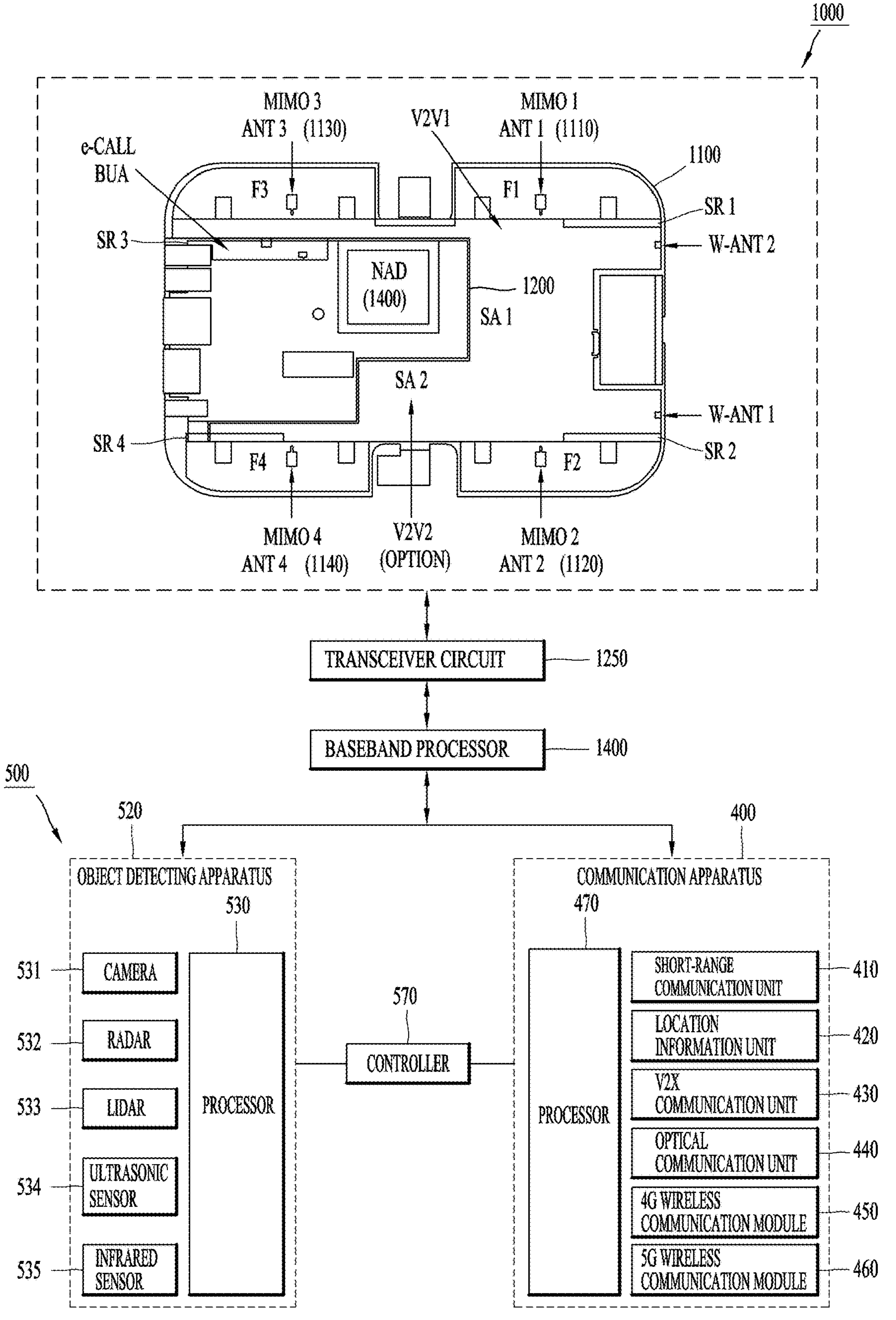

Meanwhile, FIGS. 23A and 23B are views illustrating configurations of an antenna system according to an embodiment and a vehicle on which the antenna system is mounted. FIG. 23A is a diagram illustrating a configuration including an antenna system in which a plurality of antenna structures are disposed on top and bottom of a roof of the vehicle and the vehicle on which the antenna system is mounted. FIG. 23B is a diagram illustrating the vehicle performing communication using antennas disposed inside the antenna system disposed on the bottom of the roof of the vehicle.

Referring to FIGS. 23A and 23B, the broadband antenna system 1000 may be mounted on a vehicle. The antenna system may perform short-range communication, wireless communication, V2X communication, and the like by itself or through the communication apparatus 400. To this end, the baseband processor 1400 may perform control such that a signal is received from or transmitted to the adjacent vehicle, the RSU, and the base station through the antenna system 1000.

Alternatively, the baseband processor 1400 may perform control such that a signal is received from or transmitted to the adjacent vehicle, the RSU, the adjacent object, and the base station through the communication apparatus 400. Here, the information related to adjacent objects may be acquired through the object detecting apparatus such as the camera 531, the radar 532, the LiDar 533, and the sensors 534 and 535 of the vehicle 300. Alternatively, the baseband processor 1400 may be configured to receive signals from or transmit signals to adjacent vehicles, RSUs, and base stations through the communication apparatus 400 and the antenna system 1000.

Meanwhile, referring to FIGS. 1A to 23B, the vehicle 500 having the antenna system 1000 may include the plurality of antennas 1100, the transceiver circuit 1250, and the baseband processor 1400. The vehicle 500 may further include the object detecting apparatus 520. The vehicle 500 may further include the communication apparatus 400. Here, the communication apparatus 400 may be configured to perform wireless communication through the antenna unit.

In this regard, the vehicle 500 may be provided with the antenna system 1000. Referring to FIG. 23A, the vehicle 500 may include a plurality of antenna systems 1000 and 1500. A first antenna system (module) 1000 may be disposed on the bottom of the roof of the vehicle, and a second antenna system (module) 1500 may be disposed on the top of the roof of the vehicle. Referring to FIG. 23B, the MIMO operation may be performed through the antenna system 1000 corresponding to one antenna system (unit, module).

Referring to FIGS. 1A to 23B, the first antenna system (module) 1000 and the second antenna system (module) 1500 may be referred to as the telematics module 1000 and the antenna structure 1500, respectively. The telematics module 1000 may be disposed on the bottom of the roof of the vehicle, and perform communication with at least one of an adjacent vehicle, a Road Side Unit (RSU), and a base station through the processor. At least a portion of the antenna structure 1500 may be configured to be exposed to the top of the roof of the vehicle.

In this regard, the description of the antenna system described in FIGS. 5A to 21 is also applied to the following description of the vehicle. The telematics module 1000 may include the PCB 1100, the at least one radiator 1100R, the bottom cover 1310, and the top cover 1320.

Electronic components including the at least one radiator 1100R may be disposed on the PCB 1100 corresponding to the antenna substrate. The at least one radiator 1100R may be electrically connected to the PCB 1100 and configured as a metal pattern having a predetermined length and width to transmit and receive signals.

The bottom cover 1310 may be configured as a metal plate disposed below the PCB 1100 and having the slot region SR formed in an area adjacent to an area where the radiator 1100R is connected to the PCB 1100. The top cover 1320 may be fastened to the bottom cover 1310 to accommodate the PCB 1100 and the at least one radiator 1100R therein. Accordingly, the antenna can operate a broadband operation by the metal plate on which the radiator 1100R and the slot region SR are formed.

The radiator 1100R may include the feed pattern F formed on the PCB 1100, and the first metal pattern 1111 operably coupled to the feed pattern F and formed substantially perpendicular to the PCB 1100. The radiator 1100R may further include the second metal pattern 1112 bent from the first metal pattern 1111 to be disposed substantially parallel to the top cover 1320, so as to operate in a wider band.

The first metal pattern 1111 may be configured as a circular tapered metal plate, and the second metal pattern 1112 may be configured as a metal plate having a predetermined length and a predetermined width.

The telematics module 1000 may further include the TCU substrate 1200 operably coupled to one side of the antenna substrate corresponding to the PCB 1100. At least one PCB 1100 may include the first radiator 1110 to the fourth radiator 1140 disposed in different areas of the antenna substrate corresponding to the PCB. The processor 1400 disposed on the TCU substrate 1200 may perform MIMO using two or more of the first to fourth antennas ANT1 to ANT4 corresponding to the first to fourth radiators 1110 to 1140.

The TCU substrate 1200 may be disposed in the empty area inside the PCB 1100, and the backup antenna (BUA) 1210 may be disposed on one side of the TCU substrate 1200. The slot region SR may be formed in an area of the bottom cover 1310 corresponding to the area where the backup antenna (BUA) 1210 is disposed.

The slot region SR may include first to fourth slot regions SR1 to SR4 that are disposed respectively adjacent to first to fourth feed patterns F1 to F4 of the first to fourth radiators 1110 to 1140.

Among the first slot region SR1 to the fourth slot region SR4, a first type slot region formed in an area corresponding to an area where the backup antenna (BUA) 1210 is disposed may be formed in an area toward the TCU substrate 1200. On the other hand, a second type slot region other than the first type slot region may be formed in an area toward the antenna substrate 1100. Accordingly, the first type slot region may be formed inside the bottom cover 1310 more inward than the second type slot region.

The telematics module 1000 of the vehicle may further include a switch SW that is disposed in the first type slot region SR formed adjacent to the where the backup antenna (BUA) 1210 is disposed, and electrically shorts the slot region SR. In this regard, an operating state of the switch SW may change depending on whether the backup antenna (BUA) 1210 is operating.

The telematics module 1000 of the vehicle may further include a second switch SW2 that is configured to transfer a signal to one of the backup antenna (BUA) 1210 and the radiator 1100R adjacent to the backup antenna 1210. The processor 1400 may be configured to control the operation of the switch SW and the second switch SW2.

The processor 1400 controls the operations of the switch SW and the second switch SW2 in a first mode in which the backup antenna 1210 does not operate but the radiator 1100R disposed on the antenna substrate 1100 to be adjacent to the backup antenna operates. In other words, in the first mode, the processor 1400 may control the switch SW to be shorted and the second switch SW2 to be connected to a first path. Accordingly, the slot region SR can be equalized to an electrically shorted state. This can suppress efficiency deterioration of the radiator as in the structure of (a) of FIG. 16 in which the slot region is not disposed.

The processor 1400 may control the switch SW to be open and the second switch SW2 to be connected to a second path in the second mode in which the radiator 1100R does not operate and the backup antenna 1210 operates. The second path is a path through which the wireless communication unit is connected to the backup antenna 1210 of (b) of FIG. 19. In the second mode, the processor 1400 may control the wireless communication unit so that the switch SW is open and the second switch SW2 is connected to the second path.

Accordingly, the slot region SR can be equalized to an electrically open state. Accordingly, the slot region can be disposed adjacent to the backup antenna 1210 so that the backup antenna BUA 1210 can operate as a ground boosting antenna.

The transceiver circuit 1250 may be operably coupled to the antenna elements 1110 to 1140, 1210. The processor 1400 may be operably coupled to the transceiver circuit 1250. The processor 1400 may be a baseband processor corresponding to a modem, but is not limited thereto and may be any processor that controls the transceiver circuit 1250. The processor 1400 of the vehicle may be implemented as a network access device (NAD).

The transceiver circuit 1250 may be operably coupled to the backup antenna (BUA) and the MIMO antennas ANT1 to ANT4. The transceiver circuit 1250 may be configured to control signals transmitted to the MIMO antennas ANT1 to ANT4 through the feed patterns F1 to F4. The transceiver circuit 1250 may include a front end module (FEM) such as a power amplifier or a receiving amplifier. As another example, the front end module (FEM) may be disposed between the transceiver circuit 1250 and the antenna, separately from the transceiver circuit 1250. The transceiver circuit 1250 may control the amplitude and/or phase of signals transmitted to the backup antenna (BUA) and the MIMO antennas ANT1 to ANT4 or control only some antenna modules to operate by adjusting the gain or input or output power of the power amplifier or the receiving amplifier.

The processor 1400 may be operably coupled to the transceiver circuit 1250 and may be configured to control the transceiver circuit 1250. The processor 1400 may control the transceiver circuit 1250 to control the amplitude and/or phase of the signals transmitted to the backup antenna (BUA) and the MIMO antennas ANT1 to ANT4 or to operate only some antenna modules. The processor 1400 may perform communication with at least one of the adjacent vehicle, the RSU, and the base station through the transceiver circuit 1250.

According to an embodiment, when it is determined that other communication systems do not normally operate due to a vehicle accident or component failure, the backup antenna BUA may be configured to perform an e-call function. According to another embodiment, when it is determined that the second antenna system 1500 is not normally operating, the backup antenna BUA may be configured to receive and transmit signals. According to another embodiment, when it is determined that signals are not normally received and transmitted through the MIMO antennas ANT1 to ANT4, the backup antenna BUA may be configured to receive and transmit signals.

In a case where there is a need to simultaneously receive information from various entities such as the adjacent vehicle, the RSU, and the base station for autonomous driving, etc., information may be received and transmitted through MIMO. Accordingly, the vehicle can receive different information from various entities at the same time and thus can improve its communication capacity. Therefore, the communication capacity of the vehicle can be improved through the MIMO without increasing a bandwidth.

Alternatively, the vehicle may simultaneously receive the same information from various entities, so as to improve reliability of surrounding information and decrease latency. Accordingly, Ultra Reliable Low Latency Communication (URLLC) can be performed in the vehicle and the vehicle can operate as a URLLC UE. To this end, a base station that performs scheduling may preferentially allocate a time slot for the vehicle operating as the URLLC UE. For this, some of specific time-frequency resources already allocated to other UEs may be punctured.

As described above, the plurality of antennas ANT1 to ANT4 within the antenna system 1000 may operate in the full band including the low band (LB), the mid band (MB), and the high band (HB). Here, the low band (LB) may be referred to as the first (frequency) band and the mid band (MB) and the high band (HB) may be referred to as the second (frequency) band. As another example, when the antenna system 1000 operates in the mid band (MB) and the high band (HB), the mid band (MB) is referred to as a first (frequency) band and the high band (HB) is referred to as a second (frequency) band. The 5G SUB6 band may be the same band as the LTE band in case of LTE re-farming. When 5G NR operates in a band separate from LTE, it may operate in the high band (HB) or a higher band. The 5G SUB6 band operating in the high band (HB) or higher band may also be referred to as a second (frequency) band.

The baseband processor 1400 can perform MIMO through some of the plurality of antenna elements ANT1 to ANT4 in the first frequency band. Also, the baseband processor 1400 can perform MIMO through some of the plurality of antenna elements ANT1 to ANT4 in the second frequency band. In this regard, the baseband processor 1400 can perform MIMO by using antenna elements that are sufficiently spaced apart from each other and disposed by being rotated at a predetermined angle. This can improve isolation between the first and second signals within the same band.

The baseband processor 1400 may control the transceiver circuit 1250 to receive the second signal of the second frequency band while receiving the first signal of the first frequency band through one of the first to fourth antennas ANT1 to ANT4. In this case, there may be provided an advantage that the baseband processor 1400 can advantageously perform carrier aggregation (CA) through one antenna.

Alternatively, the baseband processor 1400 may control the transceiver circuit 1250 to receive the second signal of the second frequency band through one of the third antenna ANT3 and the fourth antenna ANT4 while receiving the first signal of the first frequency band through one of the first antenna ANT1 and the second antenna ANT2. In this case, there may be provided an advantage that each antenna can be designed to optimally operate in a corresponding band.

Therefore, the baseband processor 1400 can perform carrier aggregation (CA) through a combination of the first frequency band and the second frequency band. When it is necessary to receive a large amount of data for autonomous driving or the like, reception in a broad band can be allowed through the CA.

Accordingly, eMBB (Enhanced Mobile Broad Band) communication can be performed in the vehicle and the vehicle can operate as an eMBB UE. To this end, the base station that performs scheduling may allocate a broadband frequency resource to the vehicle that operates as the eMBB UE. To this end, the CA may be performed on frequency bands that are available, except for frequency resources already allocated to other UEs.

Regard the frequency band, the low band (LB), the mid band (MB), and the high band (HB) may be referred to as the first band, the second band, and the third band, respectively. The antenna system 1000 may operate as a single antenna in the first band, the second band, and the third band corresponding to the low band (LB), the middle band (MB), and the high band (HB). In this regard, the processor 1400 may determine a resource region allocated through a physical downlink control channel (PDCCH). The processor 1400 may control the transceiver circuit 1250 to perform carrier aggregation in two or more of the first to third bands based on the allocated resource region.

The processor 1400 may perform MIMO in an EN-DC state through the first to fourth antennas ANT1 to ANT4. For example, the processor 1400 may perform an EN-DC operation through the first antenna ANT1 and the second antenna ANT2, and MIMO through the third antenna ANT3 and the fourth antenna ANT4.

In this regard, when the EN-DC operation is performed between 4G and 5G communication systems using different bands, the processor 1400 may perform the EN-DC operation through a plurality of antennas in one antenna system. Accordingly, an interference level between MIMO streams using the same band can be reduced. On the other hand, when the EN-DC operation is performed between the 4G and 5G communication systems using the same band, the processor 1400 may perform the EN-DC operation through a plurality of antennas in different antenna systems. In this case, in order to reduce the interference level in the low band (LB), the MIMO operation through the plurality of antennas in the same antenna system may be performed in the mid band (MB) or higher.

It will be clearly understood by those skilled in the art that various modifications and alternations for the aforementioned implementations related to the antenna system having the plurality of antennas, the vehicle having the antenna system, and the control operations thereof are made without departing from the idea and scope of the present disclosure. Therefore, it should be understood that such various modifications and alternations for the implementations fall within the scope of the appended claims.

In the above, the antenna system mounted in the vehicle and the vehicle equipped with the antenna system have been described. Hereinafter, a description will be given of an antenna system mounted on a vehicle, a vehicle having the antenna system, and a wireless communication system including a base station. In this regard, FIG. 24 illustrates a block diagram of a wireless communication system that is applicable to methods proposed herein.

Figure 24:
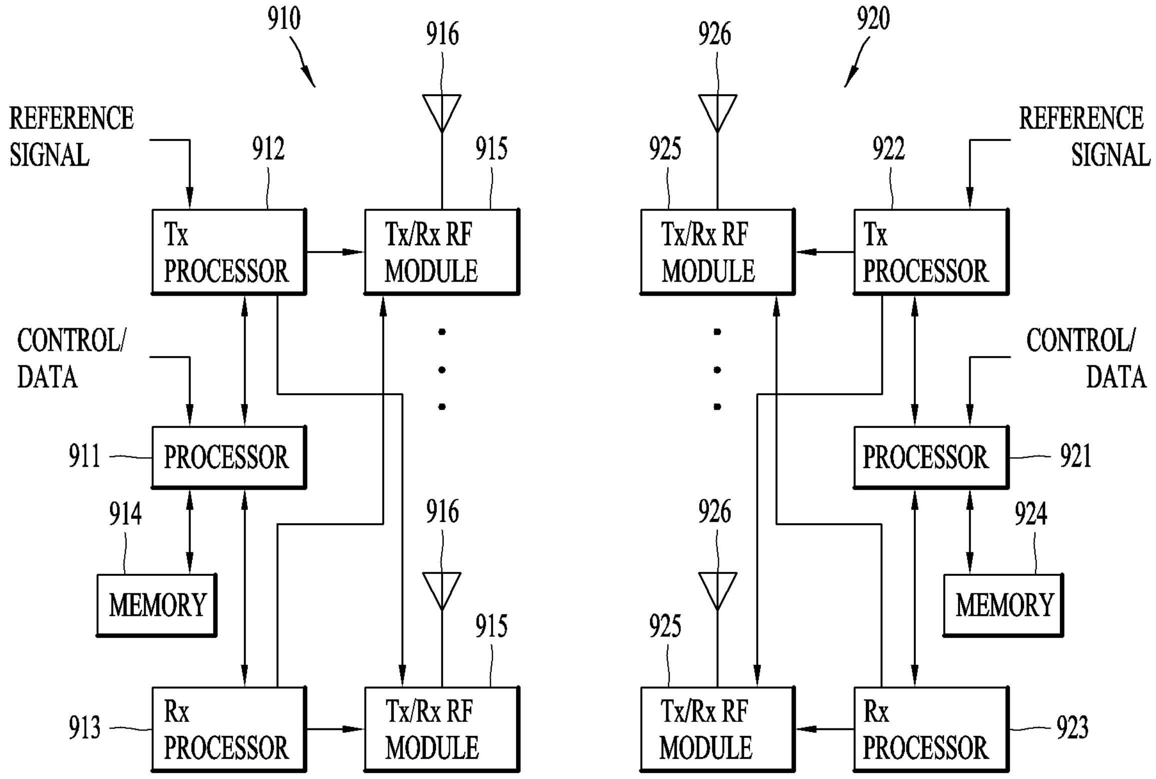
FIG. 24 is an exemplary block diagram of a wireless communication system that is applicable to methods proposed in the present disclosure.

Referring to FIG. 24, the wireless communication system may include a first communication apparatus 910 and/or a second communication apparatus 920. The term 'A and/or B' may be interpreted as having the same meaning as 'at least one of A and B'. The first communication apparatus may denote a base station and the second communication apparatus may denote a terminal (or the first communication apparatus may denote the terminal or the vehicle and the second communication apparatus may denote the base station).

The base station (BS) may be replaced with a term such as a fixed station, a Node B, an evolved-NodeB (eNB), a next generation NodeB (gNB), a base transceiver system (BTS), an access point (AP), a general NB (gNB), a 5G system, a network, an AI system, a road side unit (RSU), robot or the like. In addition, the terminal may be fixed or have mobility, and may be replaced with a term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot, an AI module, or the like.

The first communication apparatus and the second communication apparatus each may include a processor 911, 921, a memory 914, 924, one or more Tx/Rx radio frequency modules 915, 925, a Tx processor 912, 922, an Rx processor 913, 923, and an antenna 916, 926. The processor may implement the aforementioned functions, processes, and/or methods. More specifically, in DL (communication from the first communication apparatus to the second communication apparatus), an upper (high-level) layer packet from a core network may be provided to the processor 911. The processor implements the function of an L2 layer. In DL, the processor may provide multiplexing between a logical channel and a transport channel and radio resource allocation to the second communication apparatus 920, and may be in charge of signaling to the second communication apparatus. The Tx processor 912 may implement various signal processing functions for an L1 layer (i.e., a physical layer). The signal processing function may facilitate forward error correction (FEC) in the second communication apparatus, and include coding and interleaving. An encoded and modulated symbol may be divided into parallel streams. Each stream may be mapped to an OFDM subcarrier wave, multiplexed with a reference signal (RS) in a time and/or frequency domain, and combined together using an Inverse Fast Fourier Transform (IFFT) to create a physical channel carrying a time-domain OFDMA symbol stream. The OFDM stream may be spatially precoded to generate multiple spatial streams. The spatial streams may be provided to different antennas 916 via individual Tx/Rx modules (or transceiver) 915, respectively. The Tx/Rx modules may modulate RF carrier waves into the spatial streams for transmission. The second communication apparatus may receive a signal through the antenna 926 of each Tx/Rx module (or transceiver) 925. Each Tx/Rx module may demodulate information modulated to an RF carrier, and provide it to the RX processor 923. The RX processor may implement various signal processing functions of Layer 1. The RX processor may perform spatial processing with respect to the information in order to recover an arbitrary spatial stream destined for the second communication apparatus. When a plurality of spatial streams are destined for the second communication apparatus, the spatial streams may be combined into a single OFDMA symbol stream by a plurality of RX processors. The RX processor may transform the OFDMA symbol stream from a time domain to a frequency domain by using Fast Fourier Transform (FFT). A frequency domain signal may include an individual OFDMA symbol stream on a subcarrier for each OFDM signal. Symbols on each subcarrier and a reference signal may be recovered and demodulated by determining the most probable signal placement points transmitted by the first communication apparatus. These soft decisions may be based on channel estimate values. The soft decisions may be decoded and deinterleaved to recover data and control signal originally transmitted over the physical channel by the first communication apparatus. The corresponding data and control signal may then be provided to the processor 921.

UL (communication from the second communication apparatus to the first communication apparatus) may be processed in the first communication apparatus 910 in a similar manner to that described with respect to the receiver function in the second communication apparatus 920. The Tx/Rx modules 925 may receive signals via the antennas 926, respectively. The Tx/Rx modules may provide RF carriers and information to the RX processor 923, respectively. The processor 921 may operate in conjunction with the memory 924 in which a program code and data are stored. The memory may be referred to as a computer-readable medium.

Meanwhile, when the first communication apparatus is the vehicle, the second communication apparatus may not be limited to the base station. In this regard, referring to FIG. 2A, the second communication apparatus may be another vehicle, and V2V communication may be performed between the first communication apparatus and the second communication apparatus. The second communication apparatus may be a pedestrian, and V2P communication may be performed between the first communication apparatus and the second communication apparatus. Also, the second communication apparatus may be an RSU, and V2I communication may be performed between the first communication apparatus and the second communication apparatus. In addition, the second communication apparatus may be an application server, and V2N communication may be performed between the first communication apparatus and the second communication apparatus.

In this regard, even when the second communication apparatus is another vehicle, pedestrian, RSU, or application server, the base station may allocate resources for communication between the first communication apparatus and the second communication apparatus. Accordingly, a communication apparatus configured to allocate resources for communication between the first communication apparatus and the second communication apparatus may be referred to as a third communication apparatus. Meanwhile, the aforementioned series of communication procedures may also be performed among the first communication apparatus to the third communication apparatus.

In the above, the antenna system mounted on the vehicle and the vehicle equipped with the antenna system have been described. Hereinafter, technical effects of an antenna system mounted on a vehicle and the vehicle equipped with the antenna system will be described.

According to the present disclosure, an antenna can operate in a broad band by using an antenna pattern and a slot region of a ground as a radiator.

According to the present disclosure, multiple input/multiple output (MIMO) may be performed by disposing the antenna pattern and the slot region of the ground in different areas of an antenna substrate of the radiator.

According to the present disclosure, since at least one of a backup antenna and MIMO antennas shares a slot region, the backup antenna may be disposed on an antenna substrate on which the MIMO antennas are disposed.

According to the present disclosure, performance degradation of the MIMO antennas due to a slot location change can be compensated for according to a switch and a control method.

According to the present disclosure, antenna efficiency can be improved by using the antenna pattern and the slot region of the ground as the radiators.

According to the present disclosure, an antenna can be decreased in size by using the antenna pattern and the slot region of the ground as the radiators.

According to the present disclosure, by disposing a metal sheet on an antenna structure on a bottom of a roof of a vehicle, reduction in antenna efficiency due to the roof made of a metal can be suppressed.

According to the present disclosure, even when an antenna disposed on a top of the roof of the vehicle does not operate, communication can be performed through an antenna within a module disposed on a bottom of the roof of the vehicle.

According to the present disclosure, even when multiple-input/multiple-output (MIMO) antennas in an antenna module do not normally operate, communication can be performed through a backup antenna.

Further scope of applicability of the present disclosure will become apparent from the foregoing detailed description. It should be understood, however, that the detailed description and specific examples, such as the preferred embodiment of the present disclosure, are given by way of illustration only, since various modifications and alternations within the spirit and scope of the disclosure will be apparent to those skilled in the art.

In relation to the foregoing description, the antenna system mounted in the vehicle and the operation of controlling the same may be implemented by software, firmware, or a combination thereof. Meanwhile, the design of the antenna system mounted in the vehicle and the configuration of controlling the antenna system can be implemented as computer-readable codes in a program-recorded medium. The computer-readable medium may include all types of recording devices each storing data readable by a computer system. Examples of such computer-readable media may include hard disk drive (HDD), solid status disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may also include a controller of a terminal or vehicle, namely, a processor. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. An antenna system mounted on a vehicle, the antenna system comprising:

a printed circuit board (PCB) on which electronic components are disposed;

at least one radiator electrically connected to the PCB, formed of a metal pattern having predetermined length and width, and configured to transmit and receive signals;

a bottom cover disposed on a bottom of the PCB and formed of a metal plate having a slot region in an area adjacent to an area where the at least one radiator is connected to the PCB;

a top cover fastened to the bottom cover and configured to accommodate the PCB and the at least one radiator therein;

a telematics unit (TCU) substrate operably coupled to one side of an antenna substrate corresponding to the PCB; and a backup antenna (BUA) disposed on one side surface of the TCU substrate, wherein an antenna corresponding to at least one of the radiator and the metal plate having the slot region operates in a broad band, the slot region is formed in an area of the bottom cover corresponding to an area where the backup antenna is disposed, wherein the at least one radiator includes first to fourth radiators disposed on different areas of the antenna substrate corresponding to the PCB, wherein the slot region includes first to fourth slot regions disposed adjacent to first to fourth feed patterns of the first to fourth radiators, among the first slot region to the fourth slot region, a first type slot region formed in the area corresponding to the area where the backup antenna is disposed is located in an area toward the TCU, a second type slot region other than the first type slot region is located in an area toward the antenna substrate, and the first type of slot region is formed in the bottom cover more inward than the second type slot region.

2. The antenna system of claim 1, wherein the antenna operates in a first mode, which is a monopole mode, in a first frequency band of a low band (LB) by the at least one radiator, and operates in a second mode, which is a slot mode, in a second frequency band higher than the first frequency band by the slot region formed on the metal plate.

3. The antenna system of claim 1, wherein the at least one radiator comprises:

a feed pattern formed on the PCB;

a first metal pattern operably coupled to the feed pattern and formed perpendicularly to the PCB; and a second metal pattern bent from the first metal pattern and disposed substantially parallel to the top cover.

4. The antenna system of claim 3, wherein the feed pattern is formed of a metal pattern having a first width, the first metal pattern is formed to have a second width within a predetermined range from the first width in a first portion thereof connected to the feed pattern, and the first metal pattern is formed of a tapered metal plate having a third width wider than the second width in a second portion thereof connected to the second metal pattern.

5. The antenna system of claim 4, wherein the first metal pattern is formed of a circular tapered metal plate, the second metal pattern is formed of a metal plate having a predetermined length and a predetermined width, and the width of the second metal pattern is wider than or equal to the third width of the first metal pattern.

6. The antenna system of claim 3, wherein the first metal pattern is coupled to an end portion of the feed pattern through a dielectric gasket, so that a signal from the feed pattern is transferred to the first metal pattern in a coupling feed scheme.

7. The antenna system of claim 3, wherein the slot region is disposed adjacent to the feed pattern on one side of the feed pattern, and the slot region has a first length in a first axial direction, the feed pattern has a second length in a second axial direction perpendicular to the first axial direction, and a magnetic source formed in the slot region is induced to an electric source formed in the feed pattern.

8. The antenna system of claim 1, wherein a processor is disposed on the TCU substrate and performs multiple-input/multiple-output (MIMO) using two or more of first to fourth antennas corresponding to first to fourth radiators.

9. The antenna system of claim 8, wherein the TCU substrate is disposed in an empty area inside the PCB.

10. The antenna system of claim 9, further comprising a switch disposed in a first type slot region formed adjacent to the area where the backup antenna is disposed and configured to electrically short the slot region, wherein an operating state of the switch is changed depending on whether the backup antenna is operating.

11. The antenna system of claim 10, further comprising a second switch configured to transfer a signal to one of the backup antenna and a radiator adjacent to the backup antenna, wherein the processor is configured to control operations of the switch and the second switch.

12. The antenna system of claim 11, wherein the processor, controls the switch to be shorted and the second switch to be connected to a first path in a first mode in which the backup antenna does not operate and a radiator disposed on the antenna substrate to be adjacent to the backup antenna operates, and controls the switch to be open and the second switch to be connected to a second path in a second mode in which the radiator does not operate and the backup antenna operates.

13. The antenna system of claim 1, wherein a telematics unit formed by the bottom cover and the top cover is disposed on a bottom of a roof of a vehicle, and wherein an antenna including the at least one radiator and the metal plate having the slot region radiates signals in a horizontal direction and a downward direction with respect to the roof of the vehicle.

14. The antenna system of claim 1, further comprising an antenna structure configured such that at least a portion thereof is exposed to a top of a roof of a vehicle, wherein the antenna structure is configured to be coupled to the top cover, and configured to transmit a signal received through an antenna disposed therein to a telematics unit on a bottom of the roof.

15. A vehicle having an antenna system, the vehicle comprising:

a telematics module disposed on a bottom of a roof thereof, and configured to perform communication with at least one of an adjacent vehicle, a Road Side Unit (RSU), and a base station through a processor; and an antenna structure configured such that at least a portion thereof is exposed to a top of the roof, wherein the telematics module comprises:

a printed circuit board (PCB) on which electronic components are disposed;

at least one radiator electrically connected to the PCB, formed of a metal pattern having predetermined length and width, and configured to transmit and receive signals;

a bottom cover disposed on a bottom of the PCB and formed of a metal plate having a slot region in an area adjacent to an area where the at least one radiator is connected to the PCB;

a top cover fastened to the bottom cover and configured to accommodate the PCB and the at least one radiator therein;

an antenna corresponding to at least one of the radiator and the metal plate having the slot region may operate in a broad band;

a TCU substrate operably coupled to one side of an antenna substrate corresponding to the PCB; and a backup antenna (BUA) disposed on one side surface of the TCU substrate, wherein the slot region is formed in an area of the bottom cover corresponding to an area where the backup antenna is disposed, wherein the at least one radiator includes first to fourth radiators disposed on different areas of the antenna substrate corresponding to the PCB, wherein the slot region includes first to fourth slot regions disposed adjacent to first to fourth feed patterns of the first to fourth radiators, among the first slot region to the fourth slot region, a first type slot region formed in the area corresponding to the area where the backup antenna is disposed is located in an area toward the TCU, a second type slot region other than the first type slot region is located in an area toward the antenna substrate, and the first type of slot region is formed in the bottom cover more inward than the second type slot region.

16. The vehicle of claim 15, wherein the processor is disposed on the TCU substrate and performs multiple-input/multiple-output (MIMO) using two or more of first to fourth antennas corresponding to first to fourth radiators, and the TCU substrate is disposed in an empty area inside the PCB.

17. The vehicle of claim 16, further comprising a switch disposed in a first type slot region formed adjacent to the area where the backup antenna is disposed and configured to electrically short the slot region; and a second switch configured to transfer a signal to one of the backup antenna and a radiator adjacent to the backup antenna, wherein the processor, controls the switch to be shorted and the second switch to be connected to a first path in a first mode in which the backup antenna does not operate and a radiator disposed on the antenna substrate to be adjacent to the backup antenna operates, and controls the switch to be open and the second switch to be connected to a second path in a second mode in which the radiator does not operate and the backup antenna operates.

* * * * *